(12) United States Patent
Johnson et al.

(10) Patent No.: US 10,696,028 B2
(45) Date of Patent: *Jun. 30, 2020

(54) SUCCESSIVELY PEELABLE COEXTRUDED POLYMER FILM WITH EXTENDED UV STABILITY

(71) Applicant: 3M INNOVATIVE PROPERTIES COMPANY, St. Paul, MN (US)

(72) Inventors: Stephen A. Johnson, Woodbury, MN (US); Timothy J. Lindquist, Woodbury, MN (US); Terence D. Neavin, Minneapolis, MN (US); Onur S. Yordem, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/392,770

(22) Filed: Apr. 24, 2019

(65) Prior Publication Data

US 2019/0248118 A1    Aug. 15, 2019

Related U.S. Application Data

(63) Continuation of application No. 14/157,688, filed on Jan. 17, 2014, now abandoned.

(51) Int. Cl.
*B32B 27/08*    (2006.01)
*B32B 7/12*    (2006.01)
(Continued)

(52) U.S. Cl.
CPC .............. *B32B 27/08* (2013.01); *B32B 7/06* (2013.01); *B32B 7/12* (2013.01); *B32B 27/32* (2013.01);
(Continued)

(58) Field of Classification Search
CPC ......... B32B 27/08; B32B 43/006; B32B 7/06; B32B 37/153; B32B 2250/24
See application file for complete search history.

(56) References Cited

U.S. PATENT DOCUMENTS

| 3,592,710 A | 7/1971 | Yurgen |
| 4,861,630 A | 8/1989 | Mihalich |

(Continued)

FOREIGN PATENT DOCUMENTS

| EP | 1674230 | 6/2006 |
| JP | 06-143496 | 5/1994 |

(Continued)

OTHER PUBLICATIONS

Joesph Dooley and Harvey Tung, "Co-Extrusion" Encyclopedia of Polymer Science and Technology, vol. 2, p. 1-25. Oct. 21, 2001 (Year: 2001).*

(Continued)

*Primary Examiner* — Michael Zhang

(57) ABSTRACT

Multilayered polymer films are configured so that successive constituent layer packets can be delaminated in continuous sheet form from the remaining film. The films are compatible with known coextrusion manufacturing techniques, and can be made without adhesive layers between layer packets that are tailored to be individually peelable from the film. Instead, combinations of polymer compositions are used to allow non-adhesive polymer layers to be combined such that irreversible delamination of the film is likely to occur at interfaces between layer packet pairs. Some polymer layers, including at least one embedded layer, may include an ultraviolet (UV) light stabilizer such as a UV absorber, antioxidant, or hindered amine light stabilizer (HALS), and these layers may be positioned at the front of each layer packet. After the UV-stabilized layer of one packet has been (Continued)

used, the packet can be peeled away to expose a new UV-stabilized layer of the next layer packet.

21 Claims, 10 Drawing Sheets

(51) Int. Cl.
    *B32B 27/32*     (2006.01)
    *B32B 27/36*     (2006.01)
    *B32B 7/06*     (2019.01)
    *B32B 43/00*     (2006.01)
    *B32B 37/15*     (2006.01)

(52) U.S. Cl.
    CPC .......... *B32B 27/36* (2013.01); *B32B 43/006* (2013.01); *B32B 37/153* (2013.01); *B32B 2250/24* (2013.01); *B32B 2270/00* (2013.01); *B32B 2307/21* (2013.01); *B32B 2307/41* (2013.01); *B32B 2307/412* (2013.01); *B32B 2307/42* (2013.01); *B32B 2307/538* (2013.01); *B32B 2307/71* (2013.01); *Y10T 156/11* (2015.01); *Y10T 428/15* (2015.01)

(56) References Cited

U.S. PATENT DOCUMENTS

| | | | |
|---|---|---|---|
| 4,946,743 A * | 8/1990 | Winter | B32B 27/08 428/349 |
| 5,633,049 A * | 5/1997 | Bilkadi | C09D 4/00 427/164 |
| 5,997,968 A | 12/1999 | Dries | |
| 6,179,948 B1 | 1/2001 | Merrill | |
| 6,461,709 B1 | 10/2002 | Janssen | |
| 6,482,488 B1 | 11/2002 | Janssen | |
| 6,777,055 B2 | 8/2004 | Janssen | |
| 7,104,776 B2 | 9/2006 | Merrill | |
| 7,153,122 B2 | 12/2006 | Jackson | |
| 7,153,123 B2 | 12/2006 | Jackson | |
| 7,413,800 B2 | 8/2008 | Wood | |
| 8,329,276 B2 | 12/2012 | Cruz | |
| 8,603,633 B2 | 12/2013 | Sakagami | |
| 2002/0068182 A1 * | 6/2002 | Kelch | B32B 27/08 428/463 |
| 2003/0012936 A1 | 1/2003 | Draheim et al. | |
| 2003/0087054 A1 | 5/2003 | Janssen | |
| 2004/0121105 A1 * | 6/2004 | Janssen | B32B 7/06 428/40.1 |
| 2004/0258933 A1 | 12/2004 | Ennis et al. | |
| 2005/0200154 A1 | 9/2005 | Barbee | |
| 2006/0227421 A1 | 10/2006 | Stover et al. | |
| 2006/0228092 A1 | 10/2006 | Hebrink | |
| 2008/0102241 A1 | 5/2008 | Yutou | |
| 2010/0189925 A1 * | 7/2010 | Li | H01B 3/306 427/575 |
| 2010/0247824 A1 * | 9/2010 | Chang | A61J 1/10 428/35.7 |
| 2011/0316203 A1 | 12/2011 | Emslander | |
| 2012/0119404 A1 * | 5/2012 | Wallace | B32B 38/12 264/101 |
| 2013/0142975 A1 | 6/2013 | Wallace | |
| 2014/0065397 A1 | 3/2014 | Johnson | |

FOREIGN PATENT DOCUMENTS

| | | |
|---|---|---|
| JP | 2005119075 | 5/2005 |
| JP | 4010399 B2 | 11/2007 |
| JP | 2007331807 | 12/2007 |
| JP | 2008094909 | 4/2008 |
| JP | 2008200861 | 9/2008 |
| WO | WO 99/32279 | 7/1999 |
| WO | WO 2011/112817 | 9/2011 |
| WO | WO 2012/092478 | 7/2012 |
| WO | WO 2012/167222 | 12/2012 |
| WO | WO 2013/035499 | 3/2013 |
| WO | WO 2014/197344 | 12/2014 |

OTHER PUBLICATIONS

Gray, Robert L. "Hindered amine light stabilizers: recent developments." Plastics Additives. Springer, Dordrecht, 1998. 360-371. (Year: 1998).*
Grossetete, "Photochemical degradation of poly(ethylene terephthalate)-modified copolymer", Polymer, 2000, vol. 41, pp. 3541-3554.
Scheirs, "Photo-oxidation and photolysis of poly(ethylene naphthalate)", Polymer Degradation and Stability, 1997, vol. 56, pp. 339-350.
Schoolenberg, "Ultra-violet degradation of polypropylene: 1. Degradation profile and thickness of the embrittled surface layer", Polymer, 1991, vol. 32, No. 3, pp. 432-437.
Schoolenberg, "Ultra-violet degradation of polypropylene: 2. Residual strength and failure mode in relation to the degraded surface layer", Polymer, 1991, vol. 32, No. 3, pp. 438-444.
Swanson, U.S. Appl. No. 61/831,939, Successibely Peelable Coextruded Polymer Film with Embedded Antimicrobrial Layer(s), filed Jun. 6, 2013.
Lindquist, U.S. Appl. No. 14/144,097, Post-formed Successively Peelable Coextruded Polymer Film, filed Dec. 30, 2013.
Brochure by 3M Industrial Adhesives and Tapes Division, "3M™ Scotchgard™ Multi-Layer Protective Film" 2011, 2 pages.
Joespy Dooley and Harvey Tung, "Encyclopedia of Polymer Science and Technology," vol. 2, pp. 1-25, Oct. 22, 2001.
Hatfield et al., "Coextrusions for Flexible Packaging," Encyclopedia of Packaging Technology, Third Edition, Wiley, pp. 305-309, 2009.
ThomasNet "Plastic Co-extrusion" May 18, 2009, https://web.archive.org/web/2009051801324/http://www.thomasnet.com/articles/plastics-rubber/plastic-coextrusion.
Robert L. Gray, "Hindered amine light stabilizers: recent developments," Plastic Additives edited by G. Pritchard. Springer Science, pp. 360-371, 1998.
PCT International Search Report for PCT/US2015/011084, dated Apr. 29, 2015.
Nanqiao Zhou et al., Molding technology and equipment for plastic composite products, Chemical Industry Press of China, Jul. 2003, pp. 155-157 (including English translation).
Yusheng Shi et al., Polymer molding technology, Chemical Industry Press of China, Jul. 2006, pp. 211-212 (including English translation).
Wenjuan Yu, Production and design of rigid plastic packaging containers, Mar. 2009, China Textile & Apparel Press, pp. 167 (including English translation).

* cited by examiner

SUCCESSIVELY PEELABLE COEXTRUDED POLYMER FILM WITH EXTENDED UV STABILITY

FIELD OF THE INVENTION

This invention relates generally to polymer films, with particular application to such films having a multi-layered construction in which individual layers or groups of layers can be peeled apart or delaminated from the remainder of the construction. The invention also relates to associated articles, systems, and methods.

BACKGROUND

Polyester films (this term includes co-polyester and polyester blend, alloy, and mixture films) have been heavily utilized over the last several decades in a great variety of applications. Oriented polyester film products have been produced as roll goods in both monolayer and coextruded multilayered formats. Frequently, protective liner films (also referred to as premasks) are applied to one or both outer surfaces of such films for protective purposes. The liner film typically provides only a temporary protective function while the useful polyester film it is attached to is in transit between manufacturing facilities and/or to the customer, or being handled or processed. The liner film is designed to be removed by an in-house converting process or by the customer before or upon converting or installation of the useful polyester film by simply peeling the liner film, in sheet form, away from the useful polyester film, and then discarding or recycling the liner film. The liner film typically does not provide any functionality comparable to that of the useful polyester film. For example, if the useful polyester film is an optical polarizing film, the liner film does not provide any meaningful optical functionality or polarizing functionality.

It is also known to design some multilayered polymer films so that constituent layers or sheets, each with similar functionality, can be peeled apart or delaminated from the remainder of the film. One use for such films is in anti-graffiti applications. In such applications, the film in its original form may be applied to a mirror, window, or other item to be protected. The film is made up of highly transparent polymer materials, so that the appearance of the mirror, window, or other item is minimally affected by the film. If graffiti is applied to the exposed surface of the film, an outermost portion of the film, on which the graffiti resides, can be peeled away in continuous sheet form from the remainder of the film. After removal of the outermost portion, the remaining film stays in place on the item, which now appears clean and graffiti-free again. A portion of the film that was originally interior to the film, immediately beneath the outermost portion, becomes the new outermost layer. If graffiti is again applied, the new graffiti will reside on the exposed surface of the new outermost layer. The new graffiti can be removed by peeling away the new outermost layer in continuous sheet form from the remainder of the film. After removal of the new outermost portion, the remaining film stays in place on the item, which again appears clean and graffiti-free. The original film product can be made with up to 4 constituent sheets that can be sequentially removed in this manner to provide protection against repeated acts of defacement. To facilitate removal of only one sheet at a time, the product is made with kiss-cut tab-like features of differing depths near the edge of the film.

BRIEF SUMMARY

Known multilayered polymer films designed for delamination are typically made by first manufacturing the constituent sheets, and then laminating the sheets together with pressure sensitive adhesive (PSA) layers. This manufacturing approach, and film design, introduces inherent limitations in the types of films that can be made. For example, the constituent sheets need to be physically thick enough to allow the individual sheets to be processed by automated film-handling equipment without excessive tears or breakage. This places a lower limit on the thickness of the individual sheets, and a concomitant upper limit on the number of such sheets that can be laminated together to form a multilayered film that is sufficiently thin and flexible. Also, laminating sheets together that were manufactured separately tends to expose the sheets to contamination.

We have developed a new family of multilayered polymer films that are configured so that successive constituent layer packets can be delaminated in continuous sheet form from the remaining film. Here, a layer packet refers to a plurality of individual layers that are bonded to each other and that function or act like a single sheet for purposes of delamination. The new films are preferably compatible with known coextrusion manufacturing techniques to permit the layer packets to be much thinner than if a lamination manufacturing technique were used. By joining the layers together in a single coextruding process, typically at elevated temperature, the potential for contaminating the interfaces between the layers is greatly reduced. We have found that such multilayered polymer films can also be used to mitigate damage caused by excessive exposure to ultraviolet (UV) light, and can be specially adapted for such uses. For example, some of the polymer layers, including at least one embedded layer, may include a UV light stabilizer such as a UV absorber, antioxidant, or hindered amine light stabilizer (HALS), and these UV-stabilized layers may be positioned at the front of each layer packet. After the UV-stabilized layer of one packet has served its useful purpose, the packet can be peeled away to expose a new UV-stabilized layer of the next layer packet.

The new films are also preferably made without the use of adhesive layers between layer packets that are tailored to be individually peelable from the remainder of the film. (An adhesive layer in this regard refers to a layer that is tacky at room temperature.) Instead, combinations of polymer compositions are used that allow non-adhesive polymer layers to be combined in such a way that delamination of the film is likely to occur along a plurality of delamination surfaces corresponding to interfaces between adjacent layer packets. In some cases, the peel strength at the delamination surfaces is lower than the peel strength at other layer interfaces within the film. The absence of an adhesive between peelable layer packets results in the delamination being irreversible: after a layer packet is delaminated from the remainder of the film, the layer packet cannot thereafter be permanently or reliably re-affixed to the film simply by pressing the delaminated layer packet against the film.

We describe herein, inter alia, films that comprise a stack of polymer layers, the polymer layers being organized into layer packets, each of the layer packets having at least two of the polymer layers. Attachment between adjacent layer packets is weak enough to permit the layer packets to be separately irreversibly delaminated from a remainder of the stack, and the stack is configured to promote such irreversible delamination between such layer packets. All of the polymer layers in the stack of polymer layers may have respective polymer compositions that are coextrudable with each other. At least one of the polymer layers in a plurality of the layer packets comprises one or more ultraviolet (UV) light stabilizer. At least one of the polymer layers in each of the layer packets may comprise the one or more UV light stabilizer.

The one or more UV light stabilizer may include a first UV light stabilizer, and the at least one polymer layer in each layer packet that comprises the one or more UV light stabilizer may comprise the first UV light stabilizer. For each layer packet in the stack, the at least one polymer layer comprising the one or more UV light stabilizer may be disposed at a front of such layer packet. Each layer packet in the stack may further include at least one polymer layer that comprises substantially no UV light stabilizer. Each layer packet may have only one polymer layer that comprises the one or more UV light stabilizer.

The one or more UV light stabilizer may be or comprise any one of, or any combination of, a UV absorber, an antioxidant, and a hindered amine light stabilizer (HALS).

An attachment between any two adjacent layer packets may be characterized by a peel force in a range from 2 to 100 grams per inch (0.8 to 38.6 N/m). The stack may be configured with access tabs that provide access to interfaces between adjacent layer packets. The polymer layers may be arranged in a repeating AB sequence, or in a repeating ABC sequence. The stack may be configured such that for every pair of adjacent layer packets in the stack, attachment between the layer packets is weaker than attachment between the polymer layers within the layer packets, such that irreversible delamination tends to occur between the layer packets rather than within the layer packets. An attachment between adjacent layer packets may be characterized by a first peel force, and a weakest attachment of polymer layers within each layer packet may be characterized by a second peel force, and the second peel force may be at least two times the first peel force. Thus, where the polymer layers are arranged in a repeating ABC sequence, attachment between polymer layers A and C may be weaker than attachment between polymer layers A and B, and may also be weaker than attachment between polymer layers B and C.

All of the polymer layers in the stack of polymer layers may have respective polymer compositions that are melt processable at a melt temperature of 204 degrees C. (400 degrees F.) or greater. At least some of the polymer layers in the stack may be oriented and may have a birefringence of at least 0.05. None of the polymer layers that are disposed at interfaces of adjacent layer packets may be tacky at room temperature. Each of the layer packets in the stack may have a thickness of no more than 2 mils (50 microns). The polymer layers may be organized into at least N layer packets, where N is at least 5. Or N may be at least 10, and the film may have an overall thickness of no more than 15 mils (380 microns).

The film and/or the stack of polymer layers may have an average transmission over visible wavelengths of at least 80% and an optical haze of less than 15%. The optical haze may be less than 8%.

We also disclose associated methods, including methods that include providing a film that comprises a stack of polymer layers, exposing the film to ultravioled (UV) light, and delaminating a first layer packet from a remainder of the stack. The polymer layers in the stack are organized into layer packets with each layer packet having at least two of the polymer layers, and the stack is configured to promote irreversible delamination between such layer packets, and all of the polymer layers in the stack have respective polymer compositions that are coextrudable with each other. The exposing is carried out with a sufficient amount of the UV light so that the first layer packet exhibits optical degradation due to the UV exposure. At least one of the polymer layers in a plurality of the layer packets may comprise one or more UV light stabilizer. The optical degradation may be or include an increase in optical haze of 5% or more, or 3% or more, or 1% or more, and/or an increase in CIE b* color coordinate of 2 or more.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

In the figures, like reference numerals designate like elements.

DETAILED DESCRIPTION OF ILLUSTRATIVE EMBODIMENTS

Figure 1A:
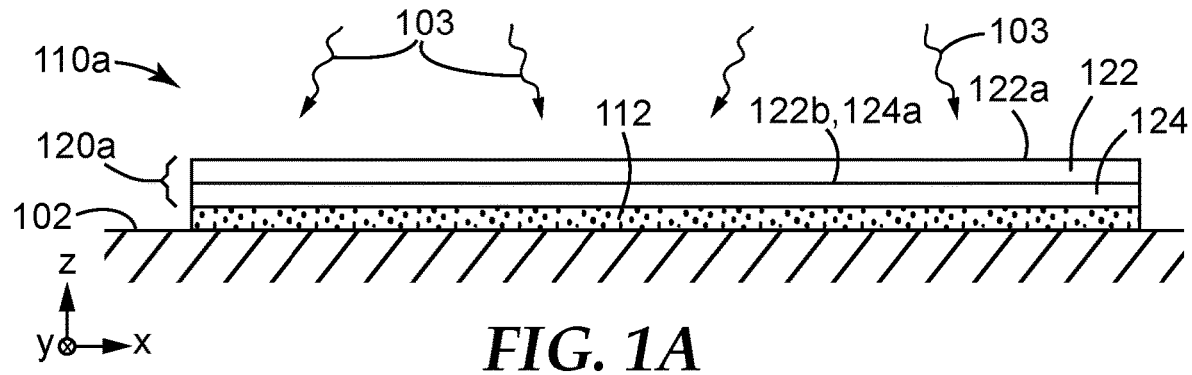
FIG. 1A is a schematic side or sectional view of a multilayered polymer film attached to a workpiece and being exposed to UV light, the film configured for successive irreversible delamination.
Figure 1B:
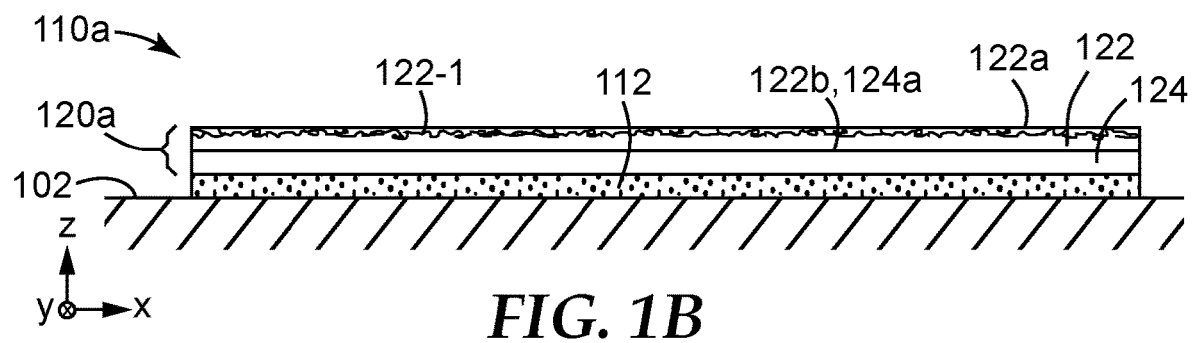
FIG. 1B is a schematic side or sectional view of the combination of FIG. 1A after the film has been exposed to enough of the UV light to produce optical degradation.
Figure 1C:
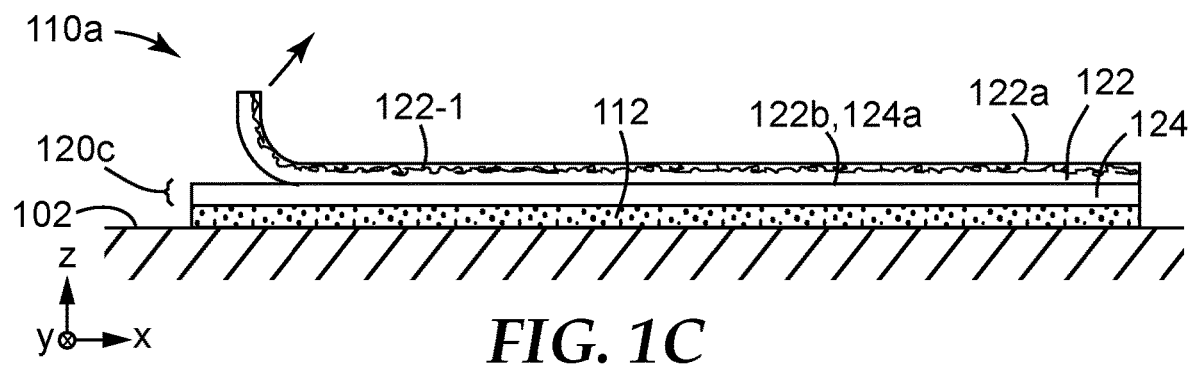
FIG. 1C is a schematic side or sectional view of the combination of FIG. 1B while delaminating or peeling away an optically degraded front-most or outermost layer packet from the film.

We have developed new multilayered polymer films in which individual layer packets can be delaminated, or peeled away, from a remainder of the film in continuous sheet form, in order to mitigate the damaging effects due to long-term UV light exposure. A stack of polymer layers are arranged or organized to form the layer packets, each layer packet having at least two of the polymer layers. The films can be made by coextruding all the polymer layers in the stack, with no need to laminate separately manufactured films or layers in order to construct the stack. This allows the layers to be less susceptible to contamination during manufacturing than layers that are separately made and then laminated together. Furthermore, coextrusion of the layers in the stack allows the individual peelable layer packets to be made much thinner than could otherwise be done, such that more separately peelable sheets can be included in a film of a given overall thickness. However, even though the layers and layer packets can be made thinner, each peelable layer packet may still be thick enough so that substantially all, or most, or at least a substantial portion of the degradation caused by the UV light is contained within a single layer packet, namely, the layer packet that is uppermost, outermost, or front-most in the stack or film, i.e., closest to the source of the UV light. The damage caused by the UV exposure can thus be substantially wholly or at least partially removed or ameliorated simply by delaminating or peeling away the outermost layer packet of the stack. In some cases, at least one of the polymer layers in the stack, or at least one of the polymer layers in a plurality of the layer packets, or at least one of the polymer layers in each of the layer packets, or exactly (only) one of the polymer layers in each of the layer packets, may contain one or more UV light stabilizer, such as a UV absorber, an antioxidant, and/or a hindered amine light stabilizer (HALS).

The term ultraviolet light or UV light as used herein refers to short wavelength electromagnetic radiation whose wavelength is below the blue limit of the visible spectrum, and that is responsible for substantial photodegradation in polymer films and similar materials, for example, the range from 300 to 400 nm. Within this range, also of particular interest is the 320-360 nm range, which is often associated with photodegradation-related chromophore development in polymers.

To reduce cost and complexity of the film design, the polymer layers in the stack may be arranged in a repeating pattern such as an AB pattern (e.g. ABABAB . . . ), an ABC pattern (e.g. ABCABCABC . . . ), an ADBC pattern (e.g. ADBCADBC . . . ), or other desired patterns, with the smallest group or set of layers in the stack that repeat corresponding to a layer packet. Numerous such layer packets can be included in the disclosed polymer stacks and multilayered films. By appropriate selection of polymer composition for the polymer layers A, B, C, etc., the layer-to-layer bond strength (sometimes also referred to herein as peel strength or peel force) can be made strong enough so that the film does not fall apart or delaminate unintentionally, e.g. while a user is manipulating it while applying it to a workpiece, but weak enough so that the user can delaminate the various layer packets from the remainder of the film without excessive force. By appropriate materials selection, the layer-to-layer bond strength can be made weaker along interfaces between adjacent layer packets than the bond strength for other layer interfaces within the stack, to facilitate delaminating or peeling away the layer packets, one layer packet at a time, from the remaining film.

As mentioned above, the films can be made by coextruding all the polymer layers in the stack, with no need to laminate separately manufactured films or layers in order to construct the stack. Optional post-casting steps, such as orienting the multilayered extrudate by stretching in a machine direction and/or in a transverse direction, can also be employed. The films can be made without the need for any pressure sensitive adhesives, or other kinds of adhesives, in the stack of polymer layers, or at least in the polymer layers that are disposed at the interfaces between adjacent layer packets. This can simplify manufacture and also produce film surfaces, which are interior to the film in the initial manufactured product but that later become exterior surfaces as layer packets are peeled away during use, that are more pristine than can be achieved in a film made by using separate lamination steps. If desired, two or more layer stacks may be bonded together with a PSA or other adhesive, or other suitable bonding material, to create a compound film product, whether or not the stacks themselves contain any PSA layers or other adhesive layers.

In exemplary embodiments, the layer stack and its constituent layer packets may be non-porous. Furthermore, each polymer layer in the layer stack may be non-porous. Non-porous layer packets are advantageous because they provide an effective barrier to water, oils, or other contaminant-carrying liquids or substances. These barrier properties can thus ensure that layer packets that are internal to the layer stack, i.e. layer packets that have not yet been exposed to air at a given point in time in the lifetime of the product, remain substantially contaminant-free and pristine.

FIGS. 1A through 1D depict a system in which a peelable multilayered polymer film is bonded to a workpiece, and protects the workpiece from UV exposure by absorbing at least some UV light that would otherwise impinge on the workpiece. These figures also show how, after experiencing photodegradation due to UV light exposure, the system can be renewed or refreshed by delaminating an outermost layer packet of the film.

Thus, in FIG. 1A, an exemplary multilayered polymer film 110a is bonded or otherwise attached to a workpiece 102 by an adhesive layer 112, which may be part of the film 110a. The workpiece 102 may be any useful device or object, for example, one that is susceptible to damage from UV light exposure, and/or one that is frequently touched and/or known or suspected of harboring or spreading germs or other microbes. In many cases it is desirable for the film 110a (and, or including, the adhesive layer 112) to be substantially transparent to visible light, such that the workpiece can be easily seen through the film. In other cases, the film 110a and/or the adhesive layer 112 may not be substantially transparent, e.g., one or both may be opaque and/or highly diffuse or light scattering. The film 110a and workpiece 102 are shown in the context of a Cartesian x-y-z coordinate system, with the film 110a lying in a plane parallel to the x-y plane, but this should not be construed to imply that the film can only assume a planar shape.

The film 110a has a stack 120a of polymer layers organized into layer packets 122, 124. Although the layer packets are shown in FIGS. 1A through 1D, the individual polymer layers that make up each layer packet are not shown in these figures. Each layer packet 122, 124 is characterized by a front and back major surface, and at least two of the individual polymer layers are disposed between the front and back major surfaces of each layer packet. Layer packet 122 has a front major surface 122a and a back major surface 122b. Layer packet 124 has a front major surface 124a (which is in intimate contact with the back major surface 122b of packet 122) and a back major surface 124b.

The reader will understand that the terms "front", "back", and the like (e.g. front-most, back-most) are used throughout this document for convenience in order to specify the ordering of the layers with respect to outer major surfaces of the film or stack, and should not be construed in a limiting way. Thus, even for films or packets that are intended for use such that one outer major surface is to face outwardly (front) and the other outer major surface is to face inwardly (back), either of these outer major surfaces may be considered the "front", and the other outer major surface would then be considered the "back".

The polymer materials in the stack 120a are selected in such a way that for every pair of adjacent layer packets in the stack, attachment between the layer packets is weaker than attachment between the polymer layers within the layer packets. In this manner, irreversible delamination tends to occur between the layer packets rather than within the layer packets. The layer packet 122 can thus be irreversibly delaminated in continuous sheet form from the remaining film 110a or stack 120a, and the film 110a can be said to be adapted for irreversible delamination. The film 110a, or at least the stack 120a, is compatible with known coextrusion manufacturing techniques, and can be made without adhesive layers between layer packets by appropriate selection of the polymer materials in the stack 120a, as discussed further below.

In FIG. 1A, the film 110a is shown being exposed to UV light 103. The UV light 103 may come from sunlight, and/or from any other naturally occurring or manmade light source that is rich in UV light.

The high energy nature of UV light can, over time, cause optical degradation in the film. In a polymer material, the optical degradation may be manifested in several ways, such as an increase in haze, and/or a change in color—typically, a yellow shift of the color. However, in many cases, due to the typically strong absorption of UV light, the optical degradation is spatially or physically localized at or near a front-most surface of the optical body in question. Thus, in the case of the multilayered polymer film 110a, the optical degradation may be localized near the front major surface 122a of layer packet 122, and the other layer packet 124 may experience little or no optical degradation. This is illustrated schematically in FIG. 1B, where, relative to FIG. 1A, like reference numerals designate like elements and need no further explanation. The film 110a is still bonded or otherwise attached to the workpiece 102 by the adhesive layer 112, but, due to the UV light exposure illustrated in FIG. 1A, the film 110a now includes a region of degradation 122-1. The layer packet 122 was closer to the UV light 103 than the layer packet 124; hence, the degradation 122-1 is closest to the front major surface 122a. The layer packet 122 is also assumed to be physically thick enough that the degradation 122-1 is substantially contained within the layer packet 122. The degradation 122-1 may be manifested optically by, for example, an increase in haze and/or a change in color of the film 110a and packet 120a.

Figure 1D:
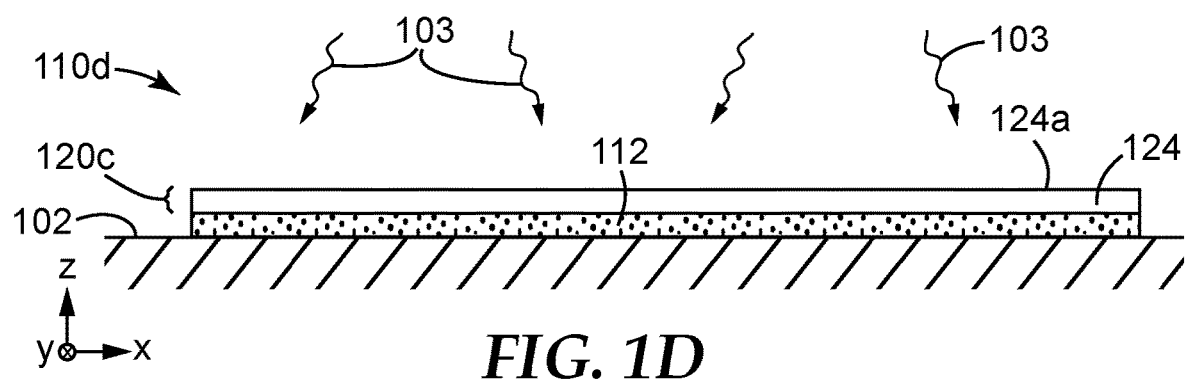
FIG. 1D is a schematic side or sectional view of the film of FIG. 1C but after the optically degraded front-most layer packet has been removed.

Conveniently, due to the delaminating characteristic of the film 110a, the damaging effects of the UV light exposure can be substantially eliminated by simply removing, by delamination or peeling away, the layer packet 122 from the remainder of the film. This is illustrated schematically in FIG. 1C, where the damaged layer packet 122 is being peeled away from the remainder of the film 110a, and where like reference numbers refer to like elements. Removal of the layer packet 122 results in a diminished film with a diminished stack 120c of polymer layers, the diminished film (after complete removal of the layer packet 122) labeled as multilayered polymer film 110d in FIG. 1D. The combination of the polymer film and the workpiece 102 is thus effectively refreshed or renewed by the removal of the damaged front-most layer packet. Further exposure of the film 110d to UV light 103 can, over time, again damage the film at the newly outermost layer packet 124. Such further exposure of the film/workpiece combination is shown in FIG. 1D.

The single cycle of UV degradation followed by renewal-by-delamination illustrated in FIGS. 1A-1D can be repeated numerous times if the initial multilayered polymer film is made to have numerous peelable layer packets. Such a starting film can have a useful life that is multiple times that of a conventional single layer polymer film, or of a polymer film that is not otherwise adapted for successive delamination. For example, conventional single layer polyethylene terephthalate (PET) is expected to last 2 to 3 years in many outdoor environments, but the disclosed peelable multilayered polymer films could potentially provide a useful life that is double, triple, or even ten times that amount, for example, potentially 20 to 30 years, assuming the multilayered film has ten peelable layer packets. The concept of delaminating damaged (optically and/or physically degraded) layer packets to provide an extended useful life for the peelable multilayered polymer film is illustrated in an idealized fashion in FIG. 2, which is a plot of optical degradation versus the exposure time of the film to UV light. The optical degradation may represent any suitable measure of the optical degradation of a film or body that results from exposure to UV light, such as optical haze, color, a combination of haze and color, or a change in any of the foregoing measures or parameters relative to an initial value.

Figure 2:
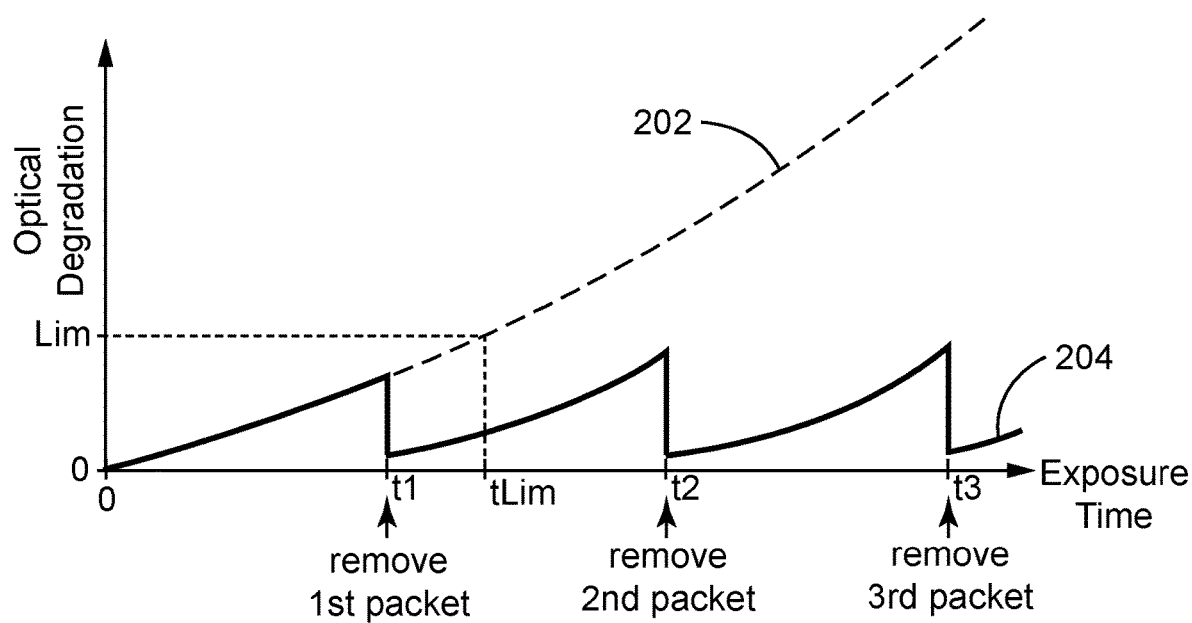
FIG. 2 is an idealized graph of optical degradation versus exposure time, showing how a successively peelable multilayered film can effectively mitigate optical degradation due to UV light exposure.

The idealized curve 202 in FIG. 2 represents the optical degradation that may typically be expected of a conventional single layer polymer film or the like. In this graph, the optical degradation is assumed to be a differential value that is calculated relative to an initial parameter or measure. The optical degradation is consequently equal to zero at an exposure time of zero. For example, if a light-transmissive film or body has an optical haze of 2% at the time of manufacture, and long-term exposure to UV light causes the haze to monotonically increase above 2%, the optical degradation at time t=0 is zero, and at any other time may be calculated by subtracting 2% (the initial value) from the actual haze of the film or body. As another example, if the light-transmissive film or body has a b* color coordinate (discussed further below) of −4 at the time of manufacture, and long-term exposure to UV light causes the b* value to monotonically increase to values greater than −4, the optical degradation at time t=0 is zero, and at any other time may be calculated by subtracting −4 (or adding 4) to the actual b* value. A differential-based optical degradation such as these starts out, at an exposure time of zero, at zero, but then may grow, e.g. monotonically, with increasing exposure time. The user may specify a threshold or limit value at which the optical degradation is unacceptable, such as the value Lim in FIG. 2. The curve 202 reaches this threshold value Lim at an exposure time of tLim. The time tLim may thus represent the useful life of the conventional single layer film or body associated with curve 202.

In contrast to this, the curve 204 may fairly represent the optical degradation of a disclosed multilayered polymer film that is configured for successive irreversible delamination. The multilayered polymer film is assumed to contain a total of N layer packets, and, from an inspection of FIG. 4, N is at least 4. Similar to curve 202, the optical degradation 204 is also zero at an exposure time of zero, since the optical degradation is assumed to be the differential value which is calculated relative to an initial parameter or measure. The curve 204 of the multilayered polymer film may monotonically increase in the same way as curve 202, and may substantially coincide with the curve 204, until the exposure time t equals t1.

At that time, an outermost or front-most layer packet of the multilayered polymer film may be delaminated or removed from the remainder of the film. In accordance with the teachings of FIG. 1, the outermost layer packet may contain substantially all, or at least most, of the UV-related damage to the film; hence, by removing such a layer packet, the multilayered polymer film can be renewed or refreshed, and the optical degradation may be immediately and substantially reduced, e.g., in some cases to a zero or near-zero level. After the outermost layer packet is removed at t=t1, the remaining multilayered polymer film of curve 204 contains only N-1 layer packets. Furthermore, after time t1, ongoing UV light exposure begins to produce further monotonic damage to the film, but the damage is now confined substantially, or mostly, to a layer packet that was originally interior to the multilayered polymer film, but is now, due to the delamination of the original outermost layer packet, the (new/second) outermost layer packet of the film. After time t1, and after the optical degradation of the film again reaches a level that is unacceptable, or as otherwise decided or judged by the user, the user may delaminate the new/second outermost layer packet from the film.

This is shown at time t=t2. At this time, again, the multilayered polymer film is renewed or refreshed, and the optical degradation is immediately and substantially reduced. After removal of the new/second outermost layer at time t2, the remaining multilayered polymer film of curve 204 contains only N-2 layer packets. And after time t2, ongoing UV light exposure begins to produce further monotonic damage to the film, but the damage is now confined substantially, or mostly, to a layer packet that was originally interior to the multilayered polymer film, but is now, due to the delamination of the original outermost layer packet and the new/second outermost layer packet, the (new/third) outermost layer packet of the film. After time t2, and after the optical degradation of the film again reaches a level that is unacceptable, or as otherwise decided or judged by the user, the user may delaminate the new/third outermost layer packet from the film.

This is shown at time t=t3. At this time, again, the multilayered polymer film is renewed or refreshed, and the optical degradation is immediately and substantially reduced. After removal of the new/third outermost layer at time t3, the remaining multilayered polymer film of curve 204 contains only N-3 layer packets.

The reader will appreciate that the repeated removal/delamination of the (current or existing) outermost layer packet of the multilayered polymer film can be used to keep the optical degradation below a predetermined limit or threshold for an extended period of time, thus greatly extending the useful life of the multilayered polymer film relative to that of a conventional single layer polymer film. The amount by which the useful life of the multilayered polymer film can be extended may depend on a number of design parameters, including the number of peelable layer packets included in the original multilayered polymer film, the particular polymer materials used in the stack of polymer layers, the particular UV light stabilizer(s) (if any) that are used in any of the polymer layers, and the selection of the optical degradation limit.

The optical degradation limit which controls the user's decision to, for example, discard a given film as having reached the end of its useful life, or delaminate an outermost layer packet from a multilayered polymer film to refresh or renew the film, may be any suitable parameter of interest to the user. In some cases, the optical degradation limit may be or include an absolute haze limit, e.g., where the optical haze of the film reaches a specified absolute value, such as a haze of 3%, 4%, 5%, or 10%. Haze, or optical haze, in this regard refers to the haze as measured with a Haze-Gard Plus hazemeter, which is commercially available from BYK instruments. The optical degradation limit may alternatively or in addition be or include a relative or differential haze limit, e.g., where the optical haze of the film changes relative to its original value by a specified amount, e.g., by at least 1%, or at least 2%, or at least 3%, or at least 5%, or at least 10%. The optical degradation limit may alternatively or in addition be or include a differential color limit, e.g., where the b* color coordinate of the film increases relative to its original value by a specified amount, e.g., by at least 2, or at least 3, or at least 4.

The b* color coordinate in this regard refers to one coordinate of the color coordinate system known as the CIE L*a*b* color space, which was developed by the Commission Internationale de l'Eclairage (CIE) in 1976. In this system, a given color is represented by a point in a three-dimensional space defined by mutually orthogonal L*, a*, and b* coordinate axes. L* is a measure of the lightness of a color, and ranges from zero (black) to 100 (white). The terms a* and b* define the hue and chroma of a color. The term a* ranges from negative numbers (green) to positive numbers (red), and the term b* ranges from negative numbers (blue) to positive numbers (yellow). The b* coordinate is of particular interest in the area of UV exposure because a common response of many materials to extended UV exposure is a yellowing of the material relative to its original color. Note that "yellowing" in this regard refers not only to a material that originally has a negative b* value which changes to a positive b* value, but also to a material whose original negative b* value becomes less negative (e.g., originally −4 and changing to −1), as well as a material whose original positive b* value becomes more positive (e.g., originally 1 and changing to 4).

Figure 3A:
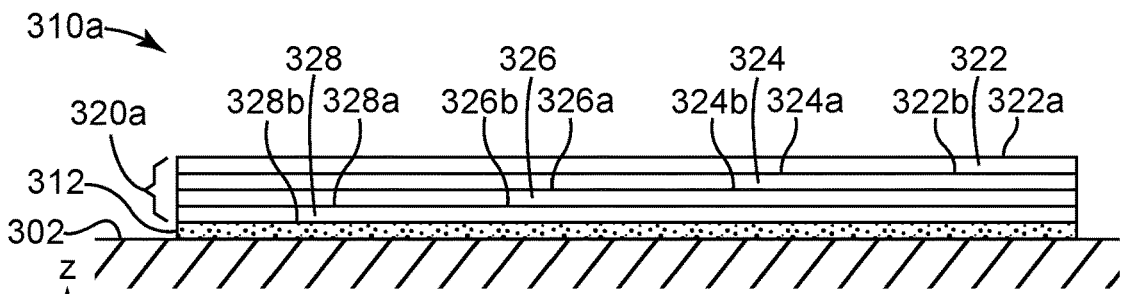
FIG. 3A is a schematic side or sectional view of a polymer film attached to a workpiece, the polymer film configured for successive irreversible delamination.

An exemplary multilayered polymer film of the type described herein is shown schematically in FIG. 3A. In this figure, film 310a is a multilayered polymer film configured so that successive constituent layer packets can be delaminated in continuous sheet form from the remaining film. The film 310a is made up of a stack 320a of polymer layers, and an adhesive backing layer 312 allowing the stack 320a to be attached to a workpiece of interest such as workpiece 302. Although the stack 320a is shown to be attached to the workpiece 302 using an adhesive, the stack 320a itself preferably contains no adhesives. The film 310a is typically relatively thin and flexible such that it can be applied to, and conform to, workpieces that are contoured rather than flat. For example, the film 310a may have an overall thickness of no more than about 510, or 380, or 300, or 200, or 100, or 50, or even 25 micrometers. Alternatively, in some cases it may be desirable for the film 310a to be relatively thick and inflexible or rigid.

Individual polymer layers of the stack 320a are not shown in FIG. 3A, but the individual layers are organized into repeating groups of layers referred to as layer packets, and these packets are shown and labeled as layer packets 322, 324, 326, and 328. Each layer packet is characterized by a front and back major surface, and, as described further below, at least two of the individual polymer layers are disposed between the front and back major surfaces of each layer packet. Layer packet 322 has a front major surface 322a and a back major surface 322b. Layer packet 324 has a front major surface 324a (which is in intimate contact with back major surface 322b) and a back major surface 324b. Layer packet 326 has a front major surface 326a (which is in intimate contact with back major surface 324b) and a back major surface 326b. Layer packet 328 has a front major surface 328a (which is in intimate contact with back major surface 326b) and a back major surface 328b.

Some or all of the layer packets may have the same or similar number of individual polymer layers, and the arrangement of the individual polymer layers within the layer packets may be the same or similar for some or all of the layer packets. Each layer packet includes a front-most polymer layer, a back-most polymer layer, and in some cases one or more additional polymer layers interior to the layer packet between the front-most and back-most polymer layers. For every pair of adjacent layer packets in the stack, attachment between the layer packets, which may be measured or quantified in terms of peel strength or peel force, is strong enough to avoid unintentional delamination, but weak enough to allow the user to delaminate the layer packets without excessive force. For example, the peel force between adjacent layer packets can be tailored to be greater than zero, e.g., at least 1 gram/inch, or at least 2 grams/inch. Peel force units of grams/inch (or grams/inch width), abbreviated g/in, are sometimes referred to as grams per linear inch, abbreviated gli. The quantity 1.0 g/in equals 0.3860886 N/m. The peel force between adjacent layer packets can be tailored to be in a range from 2 to 100 grams per inch (0.8 to 38.6 N/m).

In cases where the layer stack includes more than two different types of polymer layers, such that each layer packet includes at least three polymer layers of different composition, the stack can be designed so that the peel force is weaker at interfaces between layer packets than at other layer interfaces within the stack, such that irreversible delamination tends to occur between adjacent layer packets rather than within any of the layer packets. Regardless of how many individual polymer layers are included in each layer packet, the layer stack can also be provided with access tabs that facilitate or further facilitate delaminating the film selectively at the interfaces between layer packets rather than at interfaces within the layer packets. The interfaces between layer packets are thus sometimes also referred to herein as delamination surfaces because the film stack can be configured to preferentially delaminate at those interfaces or surfaces.

To provide films that are more robust to UV light exposure, at least some of the individual polymer layers in the stack 320a, including at least one (and typically more than one) polymer layer that is interior to the film in the initial finished product, may include one or more UV light stabilizer. The UV light stabilizer(s) is or are present in such layer(s) in an effective amount to reduce or limit damage from UV light exposure, and thus also reduce the optical degradation of interest (such as absolute haze, relative haze change, absolute b* color, relative b* color change, and combinations thereof) compared to the optical degradation that would be experienced by a substantially identical film, stack, or layer, but in which the UV light stabilizer(s) is or are omitted. To reduce cost, the UV light stabilizer(s) can be added to only some of the polymer layers, such that some of the polymer layers in the stack 320a contain an effective amount of a UV light stabilizer, while other polymer layers in the stack do not. The polymer layers in the stack 320a that contain an effective amount of the UV light stabilizer(s) are preferably selected to be the front-most or outermost layers in each of the layer stacks so that, for example, when a particular layer stack is exposed to air and to physical contact after the delamination and removal of a layer stack immediately above or in front of it, the particular layer stack in question presents an outermost polymer layer to the environment that contains the UV light stabilizer(s).

The one or more UV light stabilizer may be or comprise any one of, or any combination of, a UV absorber, an antioxidant, and a hindered amine light stabilizer (HALS). A UV absorber is a material or agent that absorbs UV light preferentially compared to other electromagnetic radiation, such as visible light. Examples of UV absorbers that may be suitable in the disclosed multilayered polymer films include those sold under the following product codes: Tinuvin™ 1577, Tinvuin™ 1600, and Tinuvin™ 900 from BASF; and Cyasorb™ UV-1164 and Cyasorb™ UV-3638 from Cytec Industries Inc. An antioxidant is a material or agent that inhibits the oxidation of other materials. Examples of antioxidants that may be suitable in the disclosed films include those sold by BASF under the product codes Irganox™ 1010 and Irganox™ 1076. A hindered amine light stabilizer (HALS) is a derivative of 2,2,6,6-tetramethyl piperidine which functions to inhibit degradation of the material in which it is incorporated. Examples of HALS that may be suitable in the disclosed films include those sold by BASF under the product code Tinuvin™ 622 and Tinuvin™ 700.

In cases where at least one polymer layer in each layer packet of the multilayered polymer film 310a contains one or more UV light stabilizer, for ease of manufacture, each such polymer layer may contain a particular (same) UV light stabilizer, e.g., a particular UV absorber, or a particular antioxidant, or a particular HALS. Alternatively, different UV light stabilizers may be used in different polymer layers in the film. For example, one polymer layer in a first layer packet may contain a first particular UV absorber, and another polymer layer in a second layer packet may contain a different second UV absorber and/or a particular antioxidant or particular HALS, and yet another polymer layer in a third layer packet may contain a different third UV absorber and/or a different antioxidant or different HALS.

Whether or not the same UV light stabilizer is used in a polymer layer in each of the layer packets, each layer packet in the stack 320a may further include at least one polymer layer that comprises substantially no UV light stabilizer. In some embodiments, each layer packet may have only one polymer layer that comprises the one or more UV light stabilizer.

Figure 3B:
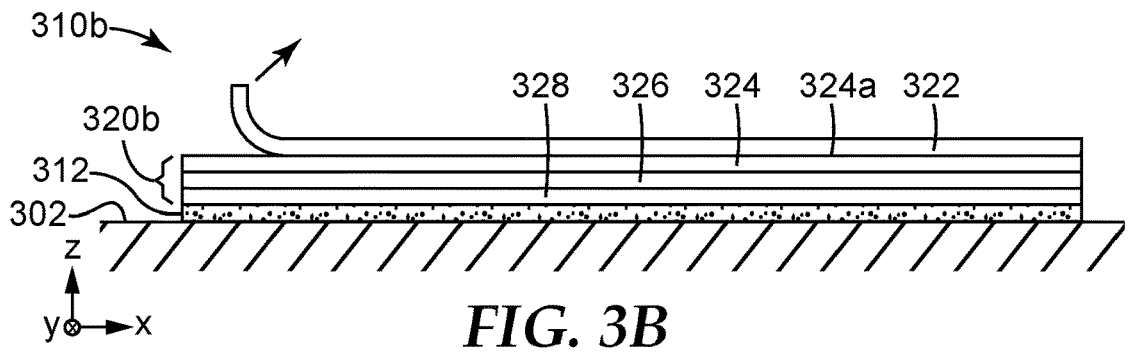
FIGS. 3B through 3E are schematic side or sectional views of the polymer film of FIG. 3A as successive layer packets are delaminated and peeled away from the film.

The delamination characteristics of the film 310a are illustrated in the sequence of FIGS. 3B through 3E. In FIG. 3B, the film 310a of FIG. 3A becomes a modified film 310b by the removal of the front-most or outermost layer packet 322. After the layer packet 322 has served its useful purpose, e.g. when the UV-induced optical degradation of the film reaches a user-specified threshold or limit, the layer packet 322 is delaminated from the remainder of the stack 320a in a continuous sheet form, such that a reduced layer stack 320b remains in place as part of the modified film 310b. Delamination occurs preferentially along a delamination surface corresponding to an interface between layer packet 322 and layer packet 324, and can be initiated by application of a tool with an adhesive contact surface, or other tacky instrument, or a knife or other sharp instrument to the edge of the film 310a. After removal of the layer packet 322, the layer packet 324 becomes the outermost layer packet of the film 310b, and the front major surface 324a of layer packet 324 becomes the front major surface of the film 310b, which is typically exposed to air or any other desired ambient environment, such as water when used underwater.

Figure 3C:
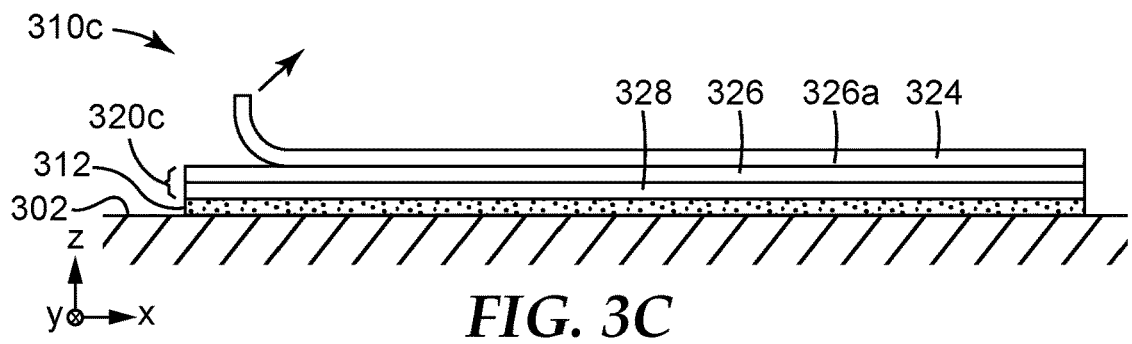

Afterwards, e.g. after the layer packet 324 has served its useful purpose and undergone UV-induced damage such that the optical degradation of the film again reaches the user-specified threshold or limit, the outermost layer packet 324 can be removed from the film 310b to form a new modified film 310c, as shown in FIG. 3C. The layer packet 324 is delaminated from the remainder of the stack 320b in a continuous sheet form, such that a reduced layer stack 320c remains in place as part of the modified film 310c. Delamination occurs preferentially along a delamination surface corresponding to an interface between layer packet 324 and layer packet 326, and can be initiated by application of a tool with an adhesive contact surface, or other tacky instrument, or a knife or other sharp instrument to the edge of the film 310b. After removal of the layer packet 324, the layer packet 326 becomes the outermost layer packet of the film 310c, and the front major surface 326a of layer packet 326 becomes the front major surface of the film 310c, which is typically exposed to air or other ambient environment. The layer packet 326 may contain an individual UV light stabilized layer (not shown) that resides at the front major surface 326a.

Figure 3D:
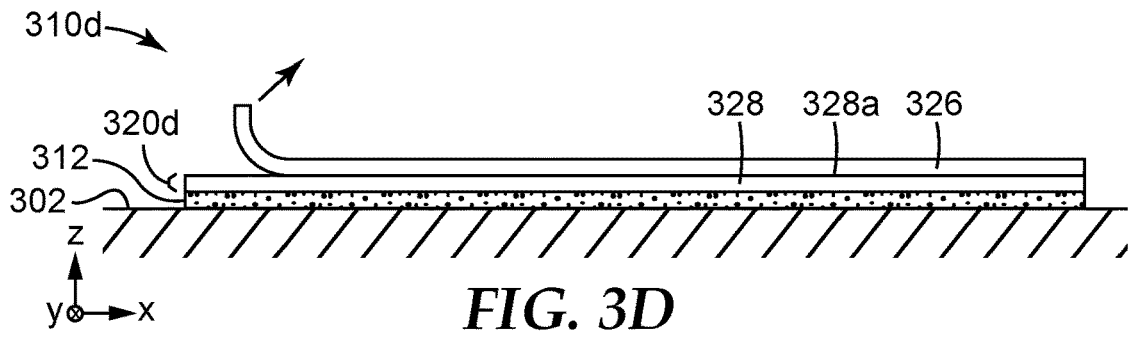

Afterwards, e.g. after the layer packet 326 has served its useful purpose and undergone UV-induced damage such that the optical degradation of the film again reaches the user-specified threshold or limit, the outermost layer packet 326 can be removed from the film 310c to form a new modified film 310d, as shown in FIG. 3D. The layer packet 326 is delaminated from the remainder of the stack 320c in a continuous sheet form, such that a reduced layer stack 320d remains in place as part of the modified film 310d. In this case, the layer stack 320d may contain enough individual polymer layers to form only one layer packet, i.e., layer packet 328. Delamination occurs preferentially along a delamination surface corresponding to an interface between layer packet 326 and layer packet 328, and can be initiated by application of a tool with an adhesive contact surface, or other tacky instrument, or a knife or other sharp instrument to the edge of the film 310c. After removal of the layer packet 326, the layer packet 328 becomes the outermost layer packet of the film 310d, and the front major surface 328a of layer packet 328 becomes the front major surface of the film 310d, which is typically exposed to air. The layer packet 328 may contain an individual UV light stabilized layer (not shown) that resides at the front major surface 328a.

Figure 3E:
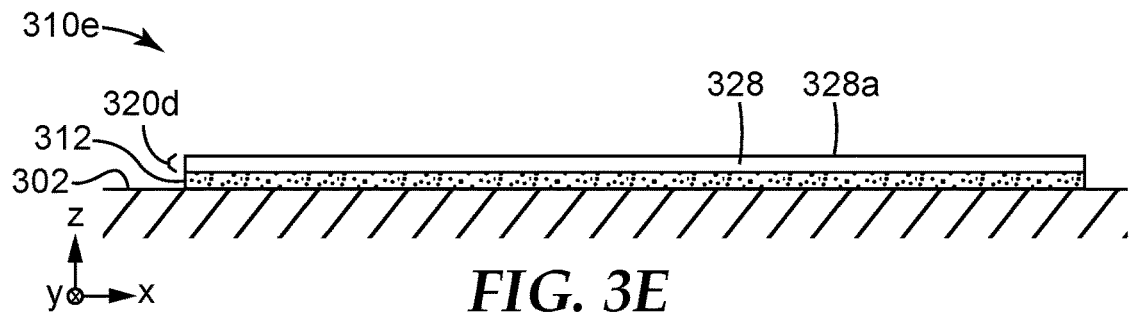

In FIG. 3E, the depicted film 310e is the same as film 310d after the complete removal of the layer packet 326. Thus, the layer stack 320d contains enough individual polymer layers to form only the layer packet 328, which remains attached to the workpiece 302 via the adhesive backing layer 312.

The reader will understand that although the original film 310a was assumed to have four layer packets, in other cases the original film may contain more than four layer packets, or, if desired, fewer than four but at least two layer packets. One benefit of making the individual polymer layers and layer packets very thin, such as can be done in a single coextrusion operation, is that many more than four layer packets, which can be removed sequentially in continuous sheet form, can be incorporated into the original film if desired.

To facilitate the sequential removal of only one sheet (layer packet) at a time and ensure delamination occurs at interfaces between layer packets, the film 310a, as well as the other multilayered polymer films disclosed herein, can be made with kiss-cut tab-like features of differing depths near the edge of the film. These features provide access to the desired delamination surfaces, and are thus also referred to herein as access tabs. Some specific embodiments are discussed further below. Furthermore, published international application WO 2012/092478 (Wu et al.) exemplifies ways in which laser radiation can be used to cut and subdivide polymeric multilayer film bodies without any substantial delamination at the laser cut edge lines, which may be useful in forming the desired tab-like features. The laser radiation is selected to have a wavelength at which at least some of the materials of the film have substantial absorption so that the absorbed electromagnetic radiation can effectively vaporize or ablate the film body along the cut line. The laser radiation is also shaped with suitable focusing optics and controlled to suitable power levels to accomplish the vaporization along a narrow cut line. The laser radiation can be rapidly scanned across the workpiece according to pre-programmed instructions, and switched on and off rapidly so that cut lines of arbitrary shape can be followed. Alternatively, mechanical blades and other cutting devices can be used instead of laser radiation to form the tab-like features.

The disclosed multilayered polymer films may, in addition to being particularly suitable in environments where UV light exposure is a concern, be tailored for a variety of purposes and for a variety of end-use applications. As mentioned above, a benefit of making the individual polymer layers and layer packets in a single coextrusion operation, rather than in separate manufacturing operations that involve handling, alignment, and lamination of separately manufactured films, is that the front major surfaces of the layer packets may be more easily maintained in a pristine and sterile state, until they are exposed by the peeling away of the layer packets in front of a given layer packet. The ability to refresh or renew those properties by successively peeling away individual layer packets makes the films particularly suitable for hospital or clinic settings in which a sterile, substantially germ-free environment is desired. However, numerous other settings may also benefit from this product feature, including homes, schools, day care centers, offices, workplaces, kitchens, restaurants, food processing areas and equipment, and heavily used public areas and places such as airports, airplanes, trains, busses, and ships. Medical devices also can benefit by covering all or part of their exposed surfaces with the disclosed peelable films. Examples include coverings for stethoscopes, blood pressure cuffs, equipment control screens and knobs, overhead lights in operating rooms, operating room tables, and the like. The touch screens on portable electronic devices such as mobile phones and smart phones are also particularly suitable workpieces for the disclosed films. Due to the peel-off nature of the layer packets or sheets, the disclosed films can also serve other purposes not directly related to germ-free applications, e.g., they may be useful for anti-graffiti purposes or for windshield protection for motor vehicles, aircraft, or watercraft. Other surfaces that may become dirty, soiled, or otherwise tainted on a regular basis, and to which the disclosed peelable films can be applied, include light covers, walls, and other surfaces in paint booths, face shields for medical and industrial applications, and baby changing stations.

In some cases, it may be important for the disclosed multilayered polymer films, or their constituent components, to be highly transparent across the visible spectrum, and optically clear, such that the presence of the film is not visually apparent to users. Such a film may be applied to visually functional workpieces, such as mirrors, windows, or electronic displays, including touch screens. In such cases, the multilayered polymer film, and all of its constituent components including its layer packets and any adhesive backing layer that may be present (e.g. adhesive layer 312), may be substantially transparent, so that the workpiece to which it is applied does not change its appearance or its functionality regardless of how much of the original film is present on the workpiece at any given time, e.g., after one or more delaminations. The stack of polymer layers in the disclosed multilayered polymer films may thus, in some cases, be made to have an average transmission over visible wavelengths of at least 80% and/or at least 88%, and/or an optical haze of less than 15% and/or less than 8% and/or less than 4%.

In other cases, the ability to see the workpiece through the peelable multilayered polymer film may not be important, or it may be undesirable. In such cases, the multilayered film, and one or more of its constituent polymer layers, may be opaque. The film or any of its layers may thus be tinted, dyed, pigmented, or otherwise configured to have an opaque or non-transparent characteristic. Printing (e.g. of inks or other materials) can be carried out on any exposed surface of the film or of the stack. Also, the multilayered film may be rendered opaque by including an additional opaque layer, e.g., positioned between an adhesive backing layer and the stack of polymer layers. This additional opaque layer may be coextruded with the stack as a "skin layer", or it may be laminated onto the stack after formation of the stack. Such an additional layer, whether coextruded as a skin layer or laminated after formation of the stack, may also be included to provide functionalities other than or in addition to opacity. Such functionalities may include antistatic properties or rigidity (when so desired), for example.

Both in cases where the film is transparent and in cases where the film is opaque, the disclosed multilayered polymer films may be used to provide a controlled surface finish at the workpiece. For example, it may be desired to effectively provide the workpiece with a high quality smooth (low roughness) surface finish. Rather than polishing the surface of the workpiece itself, the film may be applied to the workpiece to provide the needed smooth surface, while also providing protection against prolonged UV light exposure. In use, as the outer surface of the multilayered polymer film becomes abraded or otherwise non-smooth, layer packets can be sequentially peeled away to restore the desired smooth surface after repeated abrasion events. In other cases, a controlled degree of roughness may be desired at the workpiece. In such cases, a controlled amount of suitably sized beads or other particles may be provided in the front-most polymer layer of each layer packet, so that the front-most (exposed) surface of the film has the desired amount of surface roughness. If the exposed surface should become worn down, abraded, contaminated with other materials, or the like, the desired surface roughness can be easily restored by simply peeling off the outermost layer packet to uncover the pristine surface of the immediately adjacent layer packet, which again has the desired surface roughness in addition to the protection against prolonged UV light exposure.

The reader will understand that the above applications are only exemplary, and that sterile films, anti-graffiti films, and controlled surface finish films are only some of a large number of possible applications of the disclosed multilayered polymer films.

Figure 4:
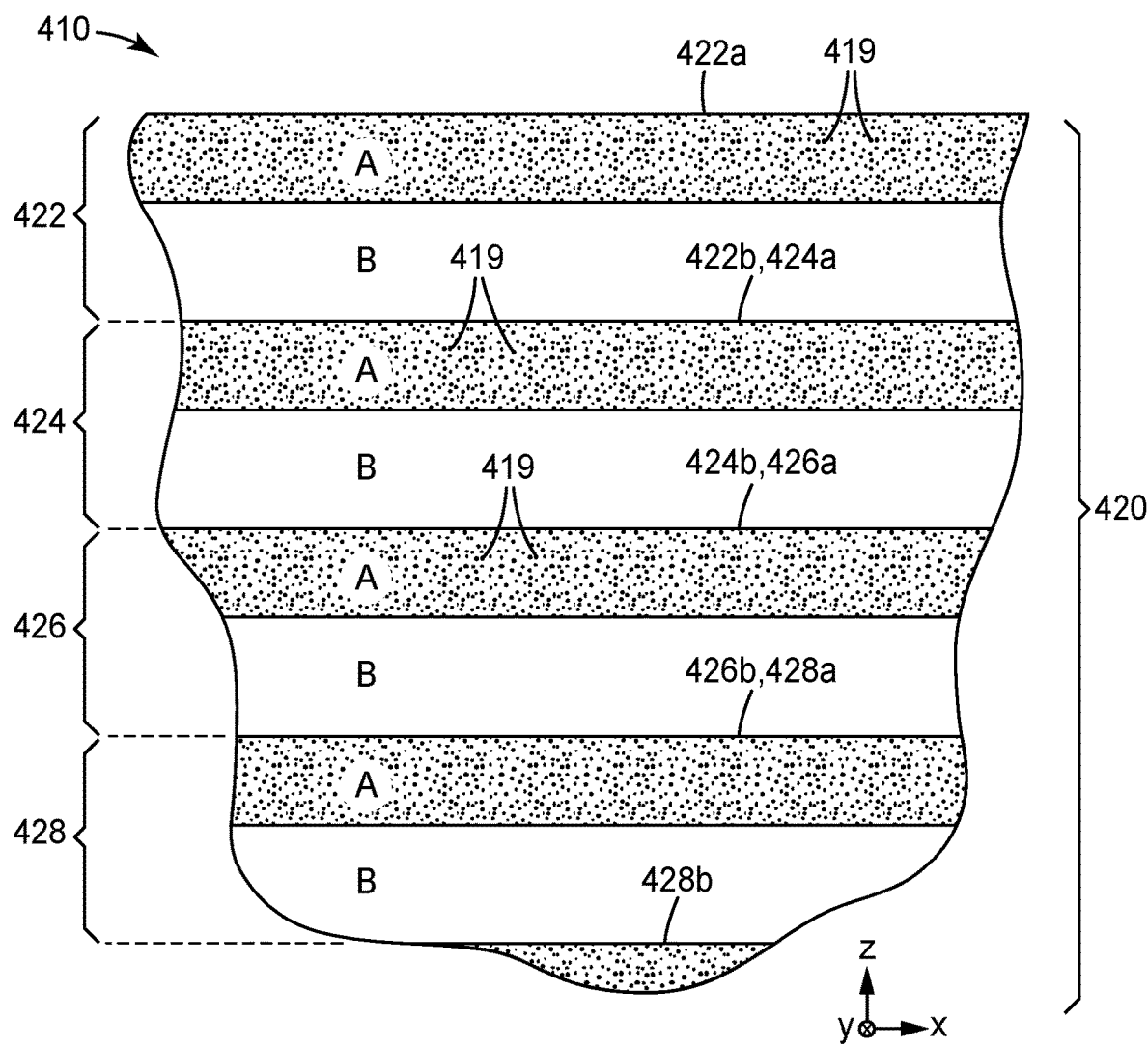
FIG. 4 is a schematic side or sectional view of a portion of a polymer film configured for successive irreversible delamination, the film being composed of a stack of polymer layers that are organized into 2-layer (A-B) layer packets.

Construction details of one possible film having the functionality shown in FIGS. 1A through 3E are revealed in FIG. 4. In this figure, we see in schematic form individual polymer layers stacked together to form a stack 420 which may form all or part of a multilayered polymer film 410. In the depicted embodiment, the stack 420 is composed of only two types of polymer layers: polymer layers A, and polymer layers B, which are assumed to be composed of different polymer compositions A and B, respectively. These two different layer types are organized into repeating groups of layers A, B, A, B, and so forth, the smallest repeat unit (A, B) being referred to as a layer packet. The film 410 has at least four layer packets 422, 424, 426, and 428. Each of these layer packets is defined by a front major surface (see surfaces 422*a*, 424*a*, 426*a*, 428*a*) and a back major surface (see surfaces 422*b*, 424*b*, 426*b*, and 428*b*). The front and back major surfaces of adjacent layer packets are in intimate contact with each other. Each of the layer packets has exactly two polymer layers disposed between the front and back major surfaces: one polymer layer A, and one polymer layer B. As shown, the A layer of a given packet is the front-most polymer layer in the packet, and the B layer is the back-most polymer layer in the packet.

An optional additive 419 is also shown in some of the layers. In exemplary embodiments the additive 419 is or includes a UV light stabilizer as discussed above. The optional additive 419 may instead or additionally be or include, for example, one or more antimicrobial agent, suitably sized beads or other particles, and/or other desired additive(s). The additive 419 may be dispersed in the front-most layer A of each layer packet, but may not be present in any of the other polymer layers. In the figure, the additive 419 is shown schematically in the form of particles, but, depending on the nature of the additive, it may be present in a given polymer layer in any desired form, including as a particulate or as a continuous or co-continuous phase material. The additive 419 may also be soluble in one, some, or all of the layers of the layer stack, including e.g. the material of the polymer layers A.

In exemplary embodiments, neither of the polymer compositions A or B are pressure sensitive adhesives (PSAs), or other types of adhesives. An "adhesive" in this regard refers to a material or layer that, when or as applied to the surfaces of different components, binds the surfaces together and resists separation, and is tacky at room temperature. Furthermore, the polymer compositions A, B are preferably coextrudable with each other, such that the entire layer stack 420 can be coextruded in a single operation rather than being made in different operations and then later laminated together with an adhesive. The polymer compositions A, B are also preferably melt processable at melt temperatures (i.e., the temperatures of the molten polymers) of 204 degrees C. (400 degrees F.) or greater. In some cases, the original multilayered polymer film may be made not only by coextrusion but also by one or more stretching or orienting steps, such that the polymer layers A, and/or the polymer layers B, are oriented. Such oriented layers may have a minimum level of birefringence, e.g. a birefringence of at least 0.05. In this regard, a given material or material layer is said to be birefringent when it has a refractive index for light polarized along one direction that differs from a refractive index for light polarized along a different direction. The "birefringence" of the material or material layer is then the maximum difference between such refractive indices. Such maximum difference may occur in some cases between two orthogonal axes that both lie in the plane of the film (e.g. the x- and y-axes in FIGS. 1A and 3A), and in other cases between two orthogonal axes one of which lies in the plane of the film and the other of which is perpendicular to the plane of the film (e.g. the x- and z-axes in FIGS. 1A and 3A). The stretching, which is sometimes referred to as drawing, can be uniaxial or biaxial, and if biaxial, may be simultaneous or sequential. The act or process of stretching the multilayered film may result in all, or only some, or in some cases none of the constituent polymer layers being oriented, depending on the materials used and the process conditions such as the temperature of the film during stretch. Reference is made to U.S. Pat. No. 6,179,948 (Merrill et al.) for further discussion of known stretching or drawing techniques. For example, a two-step drawing process can be carried out in which one set of layers (e.g. the polymer layers A) substantially orients during both drawing steps, while the other set of layers (e.g. polymer layers B) only substantially orients during one drawing step. The result is a multilayered film having one set of material layers that are substantially biaxially oriented after drawing, and having another set of material layers that are substantially uniaxially oriented after drawing.

The polymer compositions A and B may be polyester-based materials, but other suitable materials can also be used. For example, the A composition may be or comprise polyesters, polyolefins, poly-alpha-olefins, polymethacrylates, polycarbonates, polycarbonate alloys, polyurethanes, aliphatic polyesters such as polylactic acid, polyhydroxybutyrate, polyhydroxysuccinate, and the like, styrenic copolymers, silicones, or copolymers and/or blends thereof, and the B composition may for example be or comprise polyesters, polyolefins, poly-alpha-olefins, polymethacrylates, polycarbonates, polycarbonate alloys, aliphatic polyesters such as polyhydroxybutyrate, polyethylene succinate, polylactic acids, and the like, styrenic copolymers, silicones, or copolymers and/or blends thereof, with the understanding that the A and B compositions are different. Copolymers may be block or random or a combination thereof.

In some cases it may be desirable for the layer stack 420 to be ethylene oxide sterilization compatible. Ethylene oxide possesses the ability to penetrate paper, a number of plastics, and rubber. It is currently used to sterilize disposable syringes, hypodermic needles, prepackaged material, petri dishes, pipettes, etc. Advantages of ethylene oxide sterilization may include: it is suitable for thermolabile substances, because it can be carried out at, or only slightly above, room temperature; it does not damage moisture-sensitive substances and equipment because only a low humidity is required; it can be used for prepackaged articles, because of the great penetrating capability of ethylene oxide; and though ethylene oxide is a highly reactive compound, comparatively few materials are damaged by this process. Disadvantages of ethylene oxide sterilization may include: during sterilization, ethylene-oxide can be strongly adsorbed by some substances; and ethylene oxide can produce toxic substances, such as ethylene chlorohydrin, in some materials.

In certain embodiments it may be desirable to sterilize the film by ionizing radiation such as gamma radiation or electron beam. In such cases, the material compositions of the film are chosen to withstand this treatment. One or more antioxidants such as hindered phenols, phosphites, and hindered amines may need to be added in order to ensure polymer stability.

The stack 420 is preferably configured to promote irreversible delamination at interfaces between layer packets, e.g., at major surfaces 424*a*/422*b*, 426*a*/424*b*, and so forth, rather than at interfaces within any of the layer packets. In the simple AB stack, every interface in the stack is between a polymer layer A and a polymer layer B; hence, although the layer-to-layer peel strength can be tailored by appropriate selection of the polymer A and B compositions, the peel strength at every interface will be substantially the same. The stack can nevertheless be configured in other ways to promote delamination at the desired interfaces. The stack may for example be provided with physical structures that promote the delamination.

Figure 5A:
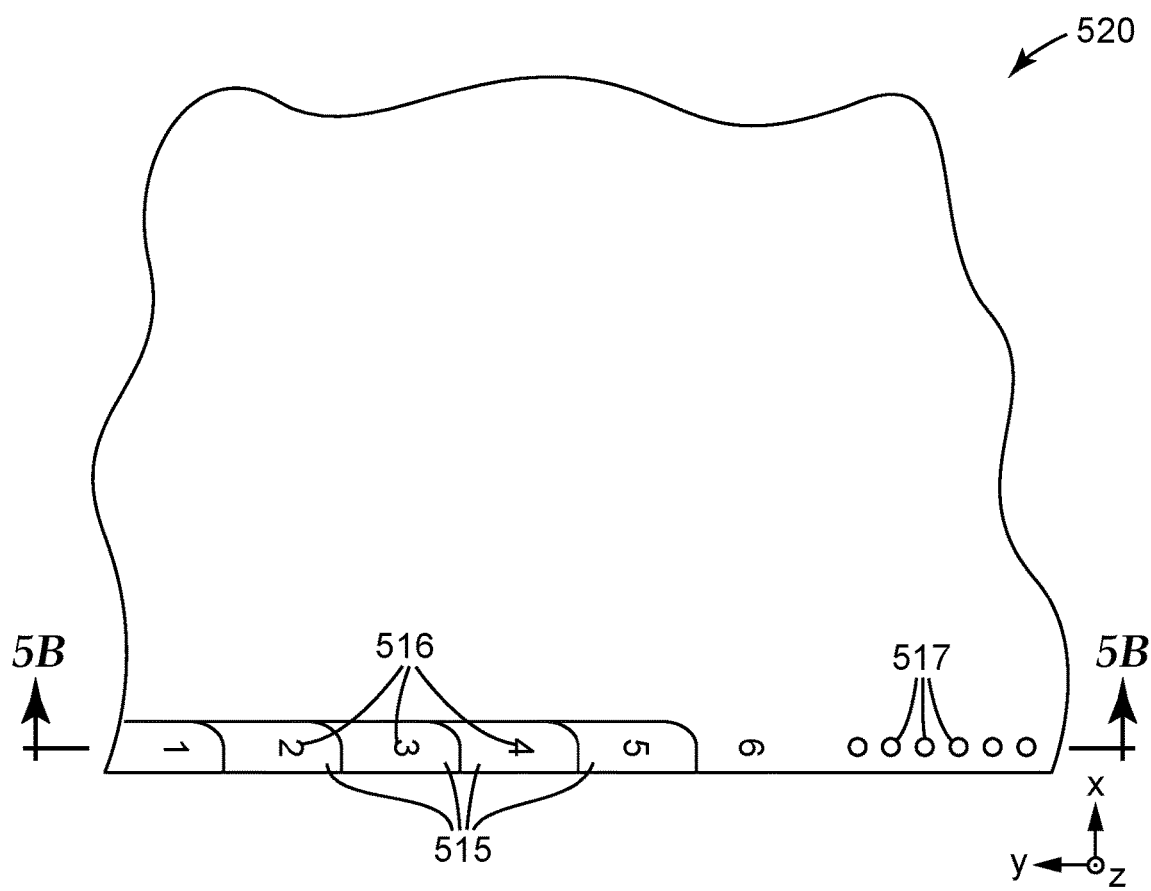
FIG. 5A is a schematic top or front plan view of a stack of coextruded polymer layers that is provided with physical structures including structures to promote delamination between layer packets.
Figure 5B:
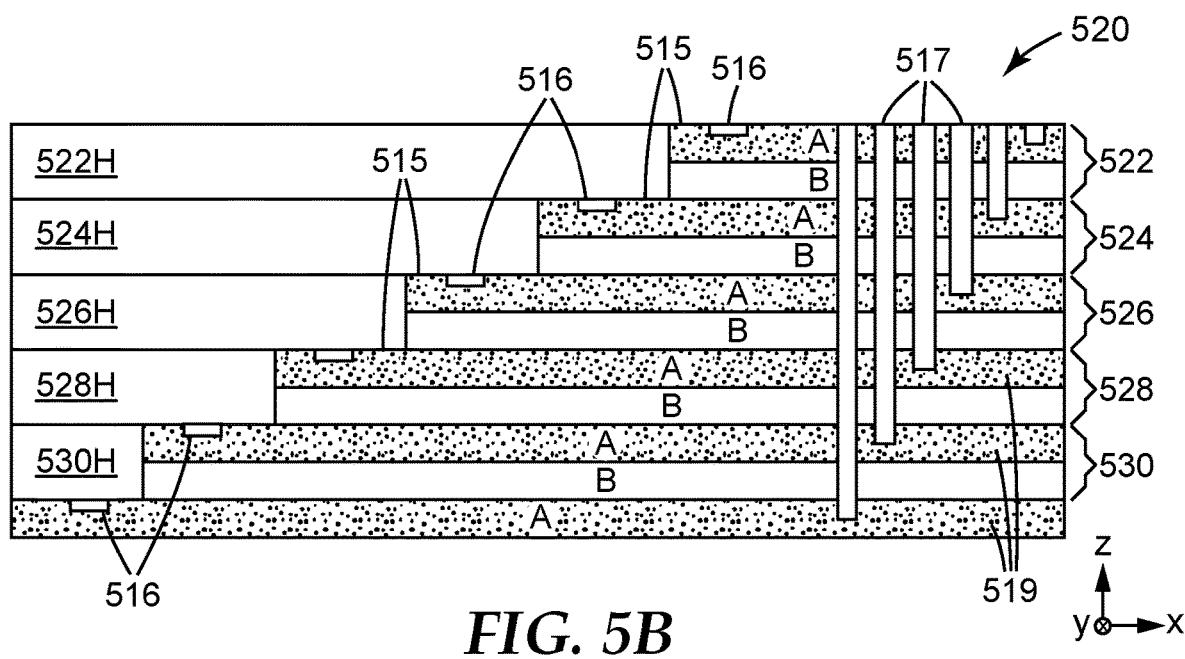
FIG. 5B is a schematic cross-sectional view along cut line 5B-5B.

An example of such physical structures is shown in the layer stack of FIGS. 5A and 5B. The layer stack shown in these figures is assumed to be part of a multilayered polymer film as discussed herein. A stack 520 of coextruded polymer layers, which may be the same as or similar to the stack 420, is shown in schematic plan view in FIG. 5A and in schematic cross-sectional view, along cut line 5B-5B, in FIG. 5B. The stack 520 has a repeating AB polymer layer construction, with pairs of adjacent layers forming AB-type layer packets 522, 524, 526, 528, 530. The polymer layers A may comprise an optional additive 519 dispersed therein, such as a UV light stabilizer, and the polymer layers B may or may not include such additive. A nested set of kiss-cut holes 522H, 524H, 526H, 528H, 530H are formed by mechanical blades, laser radiation, or any other suitable means to define access tabs 515. The kiss-cut holes and the tabs provide a stair-step-like cross sectional profile as shown in FIG. 5B. The depths of the kiss-cut holes are tailored so that the interfaces between adjacent layer packets are accessible to the user via the tabs 515. For example, a user may slide a fingernail or other sharp object along one tab towards another tab to pry the entire uppermost layer packet (which in the case of FIGS. 5A and 5B is layer packet 522) away from the remainder of the stack 520, thus exposing the polymer layer A of layer packet 524 to the environment.

Similarly, the entire film depicted in FIG. 5B, neglecting the bottom-most "A" layer, may be employed in an inverted orientation to that shown in the figure. In the inverted orientation, the layer packet 530 (with its associated hole 530H) would be the uppermost or outermost layer packet in the stack, the layer packet 522 (with its associated hole 522H) would be the bottom-most or innermost layer packet in the stack (closest to the workpiece), and the polymer "A" layers and "B" layers throughout the film (except for the omitted "A" layer) would be interchanged relative to that shown in the figure such that the layers labeled "A" in FIG. 5B would be composed of polymer B and would contain no additive, and the layers labeled "B" in FIG. 5B would be composed of polymer A and would contain the additive 519. In this orientation, rather than sliding a fingernail or other sharp object along one tab to pry the entire layer packet 522 away from the remainder of the stack, the user would grasp the tab 515 of the layer packet 530 e.g. between two fingertips and pull the tab to peel the layer packet 530 away from the remainder of the stack, in order to expose the "A" layer of the next layer packet (layer packet 528) to the environment.

Labels, indicia, or other markings or features can also be provided on or in one or more layers of the stack 520. In the depicted layer stack 520, there are two types of such markings. Markings 516 are shallow holes or depressions formed in each of the polymer layers A in the regions of the access tabs 515. The markings 516 may be shaped in plan view in the form of alphanumeric characters or other symbols. In the depicted embodiment, the markings 516 are numbers that can be observed by the user as a convenient indication of how many peelable sheets remain in the stack, and on the workpiece. For example, upon delamination and removal of the front-most layer packet 522, the marking 516 in the form of a "6" will be removed along with the packet 522, so that only the markings 516 in the form of "1", "2", "3", "4", and "5" will remain visible to the user. The markings 516 are shown as shallow holes or depressions in the polymer layers A, but they may utilize alternative designs. For example, the markings 516 may simply be alphanumeric characters or other symbols printed with ink onto the same regions of the access tabs 515.

Another type of marking shown in FIGS. 5A and 5B are the markings 517. These markings are holes of different depth through the stack 520. These holes may all open at the exposed surface of the front-most layer and terminate at different layer packets: the shallowest hole terminates in the front-most layer packet 522, the next deepest hole terminates in the next layer packet 524, the next deepest hole terminates in the next layer packet 526, and so forth. These holes are shown as simple round holes and are non-overlapping and spaced apart from each other along a straight line near an edge of the stack 520, but other designs can also be used. For example, the holes may have more complex outlines in plan view, e.g., in the form of alphanumeric characters. The markings 517 can also provide an indication to the user of how many peelable sheets or layer packets remain in the stack and on the workpiece. For example, six of the markings 517 are visible in the plan view of FIG. 5A, but after the outermost layer packet 522 is peeled away, only five of the markings 517 will remain, and after the layer packet 524 is peeled away, only four of the markings 517 will remain, and so forth.

Numerous alternative embodiments to that of FIGS. 5A and 5B can also be made. For example, the markings 516 may be omitted while retaining the markings 517, or the markings 517 may be omitted while retaining the markings 516, or both markings 516 and 517 may be omitted. Furthermore, holes 522H, 524H, etc. and access tabs 515 may also be omitted. If desired, the various layers can be made to have different colors by incorporating dyes, pigments, or other tinting or coloring agents, such that, for example, every other layer packet (or one or more layers thereof) is a different color, or the last layer packet or last few layer packets in the stack may be colored with such dyes, pigments, etc. to provide a visible indication to the user that no more layer packets (or only one or a few layer packets) are available for delamination.

The layer packets of FIG. 4 are 2-layer (A-B) packets. The reader will understand, however, that other layer types, e.g., polymer layers C, D, E, and so forth, may be added to the stack, such that the layer packets of the modified layer stack contain more than 2 individual polymer layers. Preferably, the additional polymer layers are added in such a way that the modified stack remains free of adhesive or PSA, and that the modified stack can be made by a single coextruding process, and that sheets or layer packets can be successively irreversibly delaminated from the remainder of the layer stack of the multilayered polymer film. One benefit of designing the layer packets to include more than 2 polymer layers is it allows for a variety of different layer-to-layer attachment strengths by appropriate selection of the polymer materials A, B, C, etc. This in turn allows us to select the A, B, C, etc. materials such that the weakest layer-to-layer attachment occurs at interfaces between layer packets, rather than at interfaces between layers within one or more of the layer packets. Such an arrangement can be used to configure the layer stack to promote irreversible delamination between layer packets rather than within the layer packets. Then, if desired, by ensuring that the front-most polymer layer of each layer packet includes an effective amount of a desired additive, peeling away one layer packet from the stack will result in a fresh additive-loaded layer of the underlying layer packet being the new front surface of the film.

Figure 6:
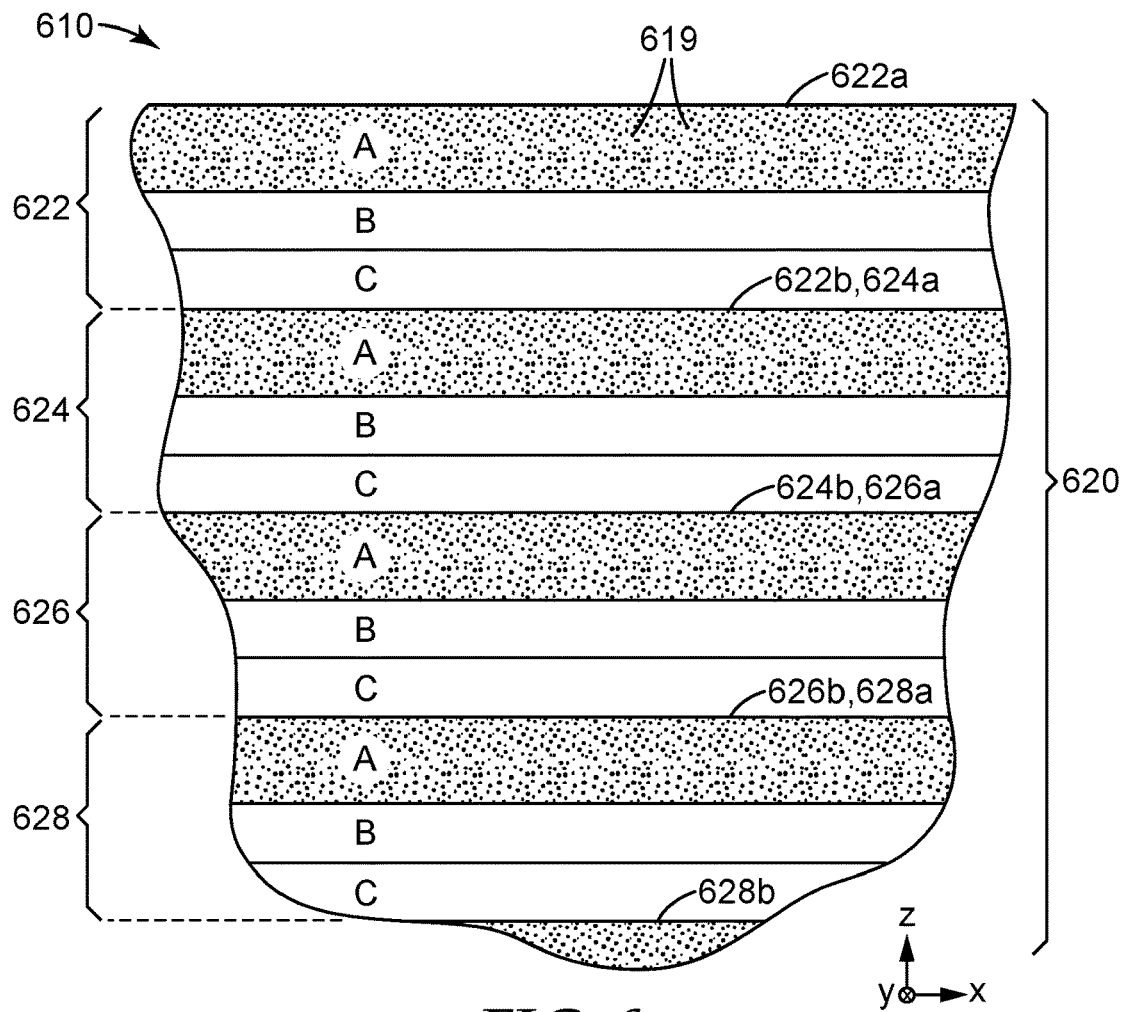
FIG. 6 is a schematic side or sectional view of a portion of a polymer film configured for successive irreversible delamination, the film being composed of a stack of polymer layers that are organized into 3-layer (A-B-C) layer packets.

Construction details of another possible film having the functionality shown in FIGS. 1A-3E are revealed in FIG. 6. In this figure, we see in schematic form individual polymer layers stacked together to form a stack 620 which may form all or part of a multilayered polymer film 610. The stack 620 may be similar to stack 420, e.g. insofar as: the polymer layers of stack 620 may be made by a single coextrusion operation, and optionally one or more stretching or orienting step; the stack 620 may contain no adhesive layers and no pressure sensitive adhesive layers; the stack 620 may include some polymer layers that have an effective amount of a desired additive 619 (such as a UV light stabilizer) including at least one such layer interior to the stack, and some polymer layers that do not; the stack 620 may be configured to promote delamination between layer packets rather than along interfaces within the layer packets; and the polymer compositions of the stack 620 may be melt processable at melt temperatures of 204 degrees C. (400 degrees F.) or greater. The stack 620 however differs from stack 420 because it is composed of more than two (three) types of polymer layers: polymer layers A, polymer layers B, and polymer layers C, which are assumed to be composed of different polymer compositions A, B, and C respectively. These three different layer types are organized into repeating groups of layers A, B, C, A, B, C, and so forth, the smallest repeat unit (A, B, C) being referred to as a layer packet. The film 610 has at least four layer packets 622, 624, 626, and 628. Each of these layer packets is defined by a front major surface (see surfaces 622a, 624a, 626a, 628a) and a back major surface (see surfaces 622b, 624b, 626b, and 628b). The front and back major surfaces of adjacent layer packets are in intimate contact with each other. Each of the layer packets has exactly three polymer layers disposed between the front and back major surfaces: one polymer layer A, one polymer layer B, and one polymer layer C. As shown, the A layer of a given packet is the front-most polymer layer in the packet, and the C layer is the back-most polymer layer in the packet, and the B layer is an interior layer (neither front-most nor back-most) in the given packet. The stack 620 is configured such that the polymer layers A contain an effective amount of an optional additive 619, such as a UV light stabilizer, while the other polymer layers (B and C) do not. In alternative embodiments, all of the layers (A, B, and C) may contain the optional additive(s).

The polymer compositions B and either A or C may be polyester-based materials. In this regard, we have developed polyester and non-polyester-based material combinations which, when incorporated properly into layers B, or A or C, respectively, in the stack 620, can cause the layer packets 622, 624, etc. to preferentially delaminate along delamination surfaces corresponding to the interfaces between adjacent layer packets (refer to the dashed lines in FIG. 6). With respect to the 3-constituent layer embodiment of FIG. 6, we have found that we can make the delamination surfaces coincide with the interfaces between the polymer C layers and the polymer A layers by making the attachment of the C layers to the A layers substantially weaker than the attachment of the C layers to the B layers, and weaker than the attachment of the B layers to the A layers. This in turn can be achieved by using a blend of polypropylene copolymer with a suitable amount of another resin for the polymer composition C. For example, polymer composition C may be a miscible blend of propylene copolymer and styrenic block copolymer, or a miscible blend of propylene copolymer and an ethylene alpha olefin copolymer, or a miscible blend of propylene copolymer and an olefin block copolymer. In cases where the polymer composition C is a miscible blend of propylene copolymer and styrenic block copolymer, the polymer composition B may be an immiscible blend of copolyester and an olefin, or the polymer composition B may be an amorphous copolyester and the polymer composition A may be a semi-crystalline polyester. In some cases, the polymer composition C may be at least partially miscible with the polymer composition B, and the polymer composition B may be at least partially miscible with the polymer composition A, but the polymer composition C may not be miscible with the polymer composition A. In this regard, a given polymer composition which is an immiscible blend of polymers, such as any of polymer compositions A, B, or C, may be said to be at least partially miscible with another polymer composition if at least one component of the immiscible blend is miscible with the another polymer composition (or with at least one component of the another polymer composition if the another polymer composition is also an immiscible blend or a block copolymer, in which case "component" refers to the individual block domains of the block copolymer). As already indicated above, even though attachment between the polymer A layers and the polymer C layers may be weakest, such attachment may still be greater than zero, e.g., the peel force at the A/C interfaces may be at least 1 gram/inch, or at least 2 grams/inch.

For the purposes of the present disclosure, the terms "miscible", "miscibility", and the like, are not meant in the absolute sense of requiring that the two or more polymers in question form one homogeneous phase of spatially-constant composition, but rather, in the relative sense that there be sufficient inter-diffusion of the two or more polymers to provide significant interactions of entanglements across the interface between phases, and/or what is sometimes referred to in the literature as an "interphase" between the layers. Miscibility in this relative sense is also sometimes referred to in the polymer science literature as "compatibility" or "partial miscibility". Further, a homopolymer or random copolymer, for instance, may be said to exhibit miscibility in this sense with a block copolymer if it has such ability to interact with the domains of just one block of the block copolymer, even if the homopolymer or copolymer is entirely immiscible with the domains of the other block(s) of the block copolymer.

Differences in degrees of miscibility among the A-B, B-C, and A-C pairs of layers is not the only way to influence the relative values of peel force among the pairs of layers. For example, the at least partial miscibility of at least one component of layer A with at least one component of layer B will tend to increase the peel force of the A-B pair, due to the increase in intermolecular entanglement across the interface between these two layers. Alternatively, the presence of macromolecular orientation, or crystallinity, or both, in at least one component of at least one of layers A and B may tend to decrease the peel force of the A-B, B-C, and/or A-C pairs of layers. This would be due to a decrease in intermolecular entanglement across the interface between the two layers which can be caused by the decreased mobility of polymer molecules which are molecularly oriented (rather than in random coil configuration), involved in structured crystallites (rather than being in an amorphous state), or both. One or more uniaxial or biaxial stretching step(s) in the film-making process can lead to molecular orientation, crystallization, or both. Thus, for layers composed at least in part of a polymer which tends to orient, crystallize, or both, under stretching, film stretching can be an alternative or a complement to altering the composition of the layers as a means of affecting the relative values of peel force among the pairs of layers. In other words, morphology (such as degree of crystalinity), as well as composition, can be used to affect the relative peel force among pairs of layers.

Thus, by designing the stack 620 so that the attachment between layer packets is weaker than attachment between layers within the layer packets, the stack 620 may thus be configured to promote delamination at the desired interfaces. However, in addition or in the alternative, the stack 620 may also be configured to promote delamination at the desired interfaces by providing the stack 620 with physical structures that promote the delamination, including in particular the access tabs and/or any of the other features discussed in connection with FIGS. 5A and/or 5B.

The layer packets of FIG. 6 are 3-layer (A-B-C) layer packets. The reader will understand, however, that the A, B, C layers may be organized differently, and/or other layer types (e.g. polymer layers D, E, and so forth) may be added to the stack, such that the layer packets contain more than 3 individual polymer layers. For example, the A, B, C layers may be arranged in an A, B, A, B, C, A, B, A, B, C, etc. arrangement, such that each layer packet is a 5-layer group (A-B-A-B-C) of polymer layers. In this case the attachment of the C layers to the A layers is again made to be substantially weaker than the attachment of the C layers to the B layers, and weaker than the attachment of the B layers to the A layers, so that delamination surfaces are formed at interfaces between the C layers and the A layers. The weak attachment of the A layers to the C layers may be greater than zero, e.g., the peel force may be at least 1 gram/inch, or at least 2 grams/inch. In this embodiment, all of the polymer layers A may be provided with one or more additives, such as one or more UV light stabilizers, while the polymer B and C layers may or may not. Alternatively, the optional additive(s) may be provided in only some of the polymer layers A, e.g., only the polymer layers A that are the front-most polymer layer of each layer packet, and in none of the remaining A layers and in none of the B or C layers.

In a given peelable film, designated layers (e.g. the polymer A layers) in the various layer packets (whether AB, or ABC, or otherwise) may contain the same additive, or different additives. In a simple case, designated layers within the film may all contain the same additive. In alternative embodiments, at least two polymer layers within different layer packets of the film may contain different additives, and in some cases each polymer layer within the film may contain a distinct additive, i.e., each polymer layer may contain an additive that is not contained in any of the other polymer layers.

Figure 7:
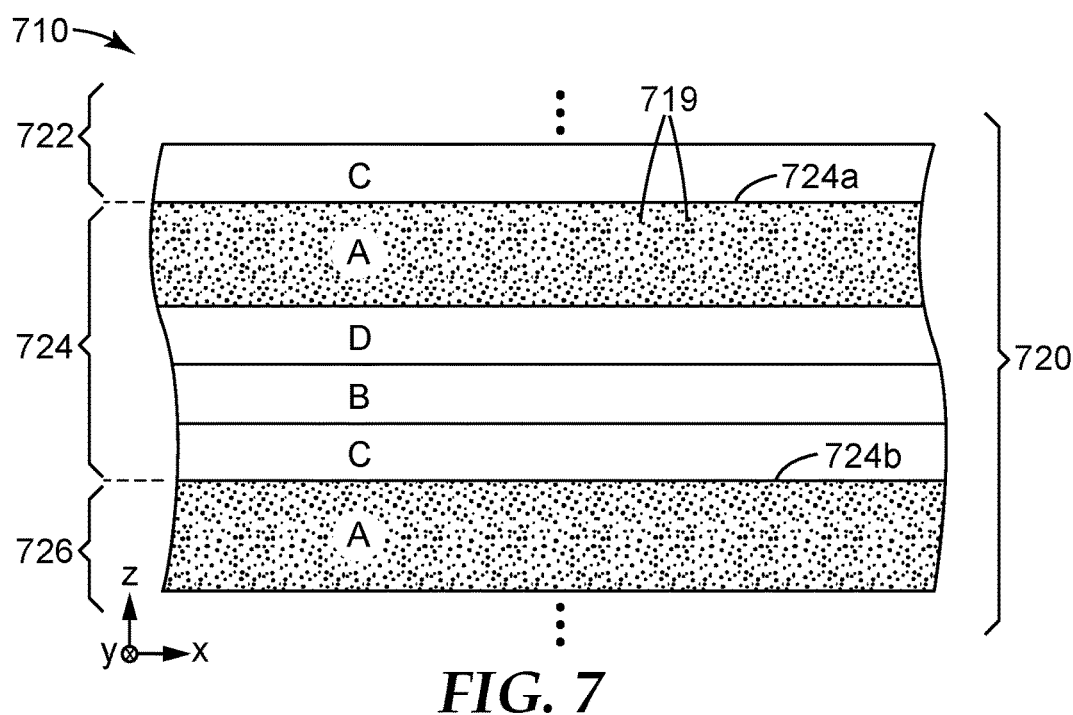
FIG. 7 is a schematic side or sectional view of a portion of a polymer film configured for successive irreversible delamination, the polymer layers in the stack being organized into 4-layer (A-D-B-C) layer packets.

In another example, polymer layers D, assumed to be made of a polymer composition D different than compositions A, B, and C, may be added to the layer stack. Such an embodiment is shown schematically in FIG. 7. In the figure, a multilayered polymer film 710, only a portion of which is shown, contains a polymer layer stack 720. The layer stack 720 is made up of four different types of polymer layers: polymer layers A, B, C, and D, composed of different polymer compositions A, B, C, and D, respectively. None of the compositions A, B, C, D are pressure sensitive adhesives (PSAs), or other types of adhesives, and these polymer compositions are preferably coextrudable with each other, such that the entire layer stack 720 can be coextruded in a single operation. The polymer compositions A, B, C, D are also preferably melt processable at melt temperatures of 204 degrees C. (400 degrees F.) or greater. Any or all of the polymer layers A, B, C, and/or D may also be oriented, and may have a birefringence of at least 0.05. The stack 720 is configured such that the polymer layers A contain an effective amount of an optional additive 719, while the other polymer layers (B, C, and D) do not.

The polymer layers are organized in a repeating sequence A, D, B, C, A, D, B, C, etc., and the polymer compositions are tuned so that attachment of the C layers to the A layers is weaker than the attachment of any other adjacent layer pairs in the stack 720, analogous to the embodiment of FIG. 6. In this way, the polymer layers are organized into 4-layer layer (A-D-B-C) layer packets, and delamination preferentially occurs along delamination surfaces corresponding to the interfaces between adjacent layer packets (refer to the dashed lines in FIG. 7), i.e., to the interfaces between the polymer C layers and the polymer A layers.

Thus, by designing the stack 720 so that the attachment between layer packets is weaker than attachment between layers within the layer packets, the stack 720 may thus be configured to promote delamination at the desired interfaces. However, in addition or in the alternative, the stack 720 may also be configured to promote delamination at the desired interfaces by providing the stack 720 with physical structures that promote the delamination, including in particular the access tabs and/or any of the other features discussed in connection with FIGS. 5A and/or 5B.

Figure 8:
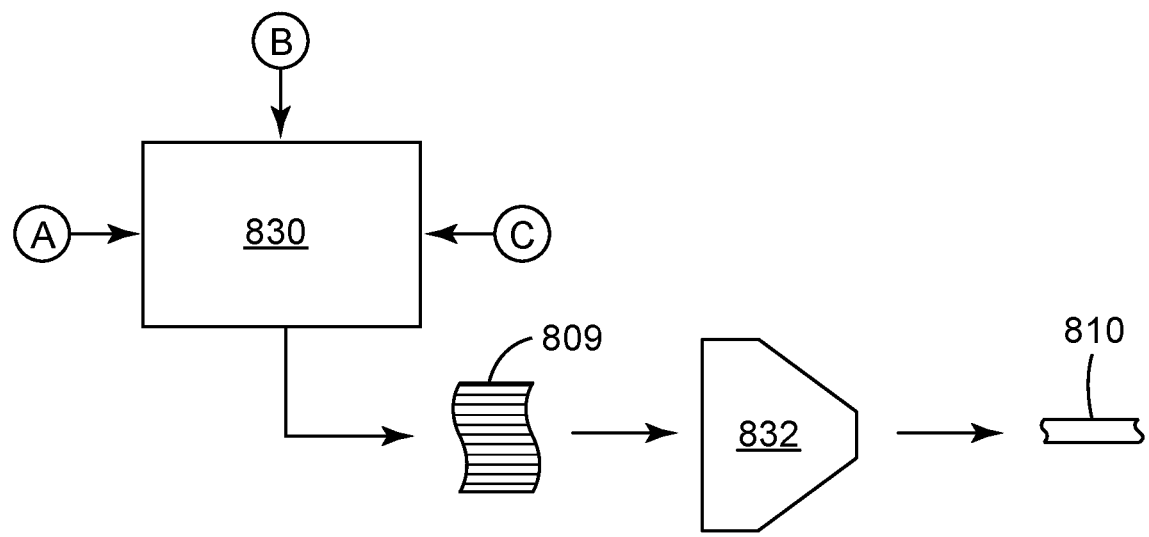
FIG. 8 is a schematic representation of a manufacturing system in which different polymer materials are coextruded to form a multilayered polymer film.
Figure 9:
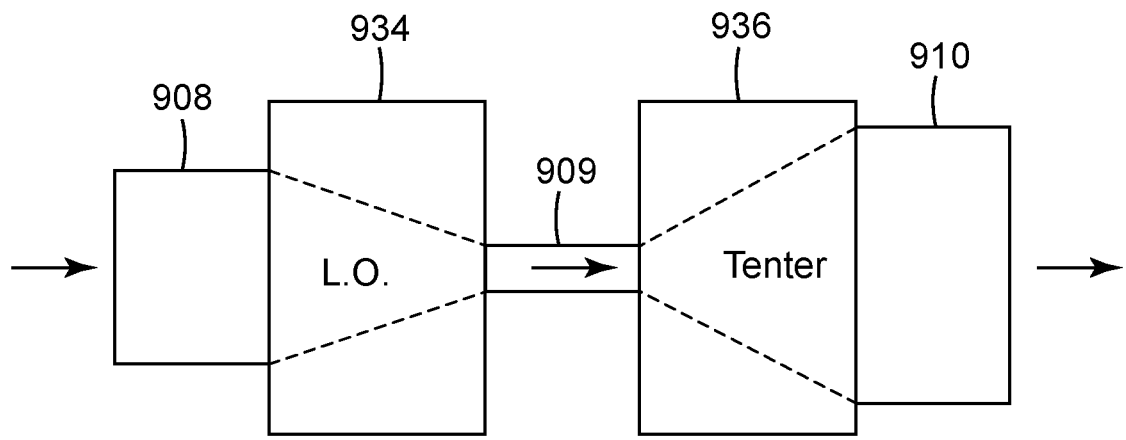
FIG. 9 is a schematic representation of film processing equipment that can be used to stretch a cast multilayered polymer film.

FIGS. 8 and 9 are schematic representations of manufacturing systems that can be used in the manufacture of the disclosed multilayered polymer films. FIG. 8 schematically depicts the coextrusion of three polymer compositions A, B, C as described elsewhere herein to form a multilayered polymer film 810. In alternative embodiments, only two polymer compositions (e.g., A, B) may be used, while in other embodiments more than three polymer compositions (e.g., A, B, C, D) may be used. The compositions can be fed via twin-screw extruders or other suitable means to a feedblock 830 that interleaves the molten polymer flow paths so that they form a multilayered extrudate 809. In cases where three polymer compositions are used, the A, B, and C polymer layers may be arranged in the extrudate 809 in the repeating pattern desired in the finished film. In some cases, the extrudate 809 may be fed into one or more layer multiplier units to form an output extrudate having a multiple (e.g., 2×, 3×, or 4×) of the number of layers in the original extrudate 809. Whether or not layer multipliers are used, the multilayered extrudate can then be fed into a film die 832, the output of which can be quenched on a casting wheel to form a cast multilayered polymer film. In some cases, the cast film may, with no additional components or features, become the multilayered polymer film 810. In some cases, additional layers and coatings may be applied to the cast film for additional functionality. For example, a release liner may be applied to one or both exposed major surfaces of the cast film. Also, an adhesive backing layer may be coated onto one of the exposed major surfaces of the cast film so that it can be readily applied to workpieces of interest. Physical structures, including in particular access tabs and/or other features discussed herein, may also be provided. Regardless of how many additional layers and coatings are applied, the multilayered polymer film 810 includes the stack of polymer layers formed by coextrusion using the feedblock 830, optional layer multiplier(s), and die 832. The layers in the stack may be organized into layer packets tailored to irreversibly delaminate from each other as discussed elsewhere herein.

In some cases, it may be desirable to stretch or orient the multilayered cast film, whether to impart a birefringence to some or all of the individual layers in the film, or to change other material properties of some or all of the individual polymer layers. Such stretching or orientation is depicted schematically in FIG. 9. A multilayered cast film 908, which may be the same as or similar to the cast film 810 of FIG. 8, and which includes at least two, three, or more different polymer layer types arranged in the repeating pattern desired in the finished film, may be fed into one or more known film-handling devices that stretch the film in the down-web direction and/or in the cross-web direction, whether sequentially, simultaneously, or a combination thereof, to provide an oriented multilayered polymer film 910 with the delamination characteristics described herein. In FIG. 9, the multilayered cast film 908 is shown being fed first into a length orienter (L.O.) 934, which stretches the film in the down-web direction to provide a preliminary oriented film 909, followed by a tenter 936, which stretches the film in the cross-web direction, to yield the oriented multilayered polymer film 910. In alternative embodiments, the length orienter 934 may be omitted, or the tenter 936 may be omitted, or additional length orienter(s) and/or tenter(s) may be added. A tenter designed to be capable of stretching the film in both the downweb and crossweb directions simultaneously (not shown) may also be used, either alone or in combination with the aforementioned stretching devices. Specially designed tenters such as so-called parabolic tenters may also be used, alone or in combination with other stretching units. See for example U.S. Pat. No. 7,104,776 (Merrill et al.), U.S. Pat. No. 7,153,122 (Jackson et al.), and U.S. Pat. No. 7,153,123 (Jackson et al.). In other embodiments (not shown), the cast film may be formed into a tubular rather than flat-film configuration, and the tubular cast film may then be stretched using blown film processes or the like. The methods that can be used for stretching/orienting the cast film into a stretched film are not limited.

Similar to the discussion above in connection with FIG. 8, the oriented film 910 may, with no additional components or features, become the multilayered polymer film whose delamination properties are discussed herein. In other cases, additional layers and coatings, such as release liner(s) and adhesive backing layer(s), may be applied to the oriented film for additional functionality. Physical structures, including in particular access tabs and/or other features discussed herein, may also be provided. Regardless of how many additional layers and coatings are applied, the multilayered polymer film includes the stack of polymer layers formed originally by coextrusion, and then optionally oriented by stretching, the layers in the stack being organized into layer packets tailored to irreversibly delaminate from each other as discussed elsewhere herein.

As a result of the polymer layers in the layer stack being preferably compatible with simultaneous formation by coextrusion, as depicted in FIG. 8, the individually peelable layer packets can be made thinner than if they were manufactured separately and then laminated to each other. Preferably, each of the layer packets in the stack may have a thickness of no more than about 2 mils (about 50 microns). Furthermore, the layer stack may contain a total of N layer packets, and N may be at least 5 or at least 10, and the film may have an overall thickness of no more than about 15 or 20 mils (about 380 or 510 microns respectively). At least N-1 of the layer packets may have a same number M of the polymer layers, and M may be at least 2, or at least 3. The M polymer layers may be arranged in a sequence that is the same for the N-1 layer packets or for all N layer packets.

Of some importance to the ability of some of the disclosed films to preferentially delaminate at a particular type of interface that repeats throughout a stack of polymer layers is the appropriate selection of the polymer compositions of the various layer types within the stack. For such films, we may assume that the stack includes individual polymer layers organized into layer packets, each layer packet having a front-most polymer layer, a back-most polymer layer, and at least one interior polymer layer. We may further assume that the layer stack is tailored to preferentially delaminate at delamination surfaces corresponding to interfaces between the front-most layer and back-most layer of adjacent layer packets. In such cases, generally, suitable compositions for the front-most layer can be selected from polyester, copolyesters, acrylics, and silicone thermoplastics. Furthermore, suitable compositions for the back-most layer can be selected from blends of olefins such as polypropylene or polyethylene blended with suitable amounts of a styrenic block copolymer, or an ethylene alpha olefin copolymer, or an olefin block copolymer. Still further, suitable compositions for the interior polymer layer can be selected from a variety of polymers and polymer blends, including but not limited to copolyesters, PMMA, co-PMMA, styrenic block copolymers, polypropylene, and silicone polyoxamides. Note that not all combinations of the aforementioned suitable compositions for the different layer types will yield the desired results, and judgment should be used to identify appropriate combinations of the polymer materials for use in the different layer types to achieve the desired functionality and delamination characteristics. For example, the front-most layer may be or comprise a semi-crystalline polyester, the back-most layer may be or comprise a polypropylene blended with a styrenic block copolymer, an ethylene alpha olefin copolymer, or an olefin block copolymer, and the interior layer may be or comprise a copolyester. In another example, the front-most layer may be or comprise polymethylmethacrylate (PMMA) or co-PMMA, the back-most layer may be or comprise a blend of polypropylene and a styrenic block copolymer, and the interior layer may be a blend of PMMA or co-PMMA with a styrenic block copolymer or polypropylene. In still another example, the front-most layer may be or comprise a silicone polyoxamide, the back-most layer may be or comprise polypropylene and a styrenic block copolymer, and the interior layer may be a styrenic block copolymer.

In one approach to tailoring the attachment strength of one polymer layer to other polymer layers in the layer stack, a polymer composition composed of a blend of polypropylene and one of several copolymer resins exhibits an attachment strength to other polypropylene layers that is a function of the proportion of the blended ingredients. This approach is discussed in more detail in commonly assigned U.S. patent publication no. 2014/0065397.

Figure 10:
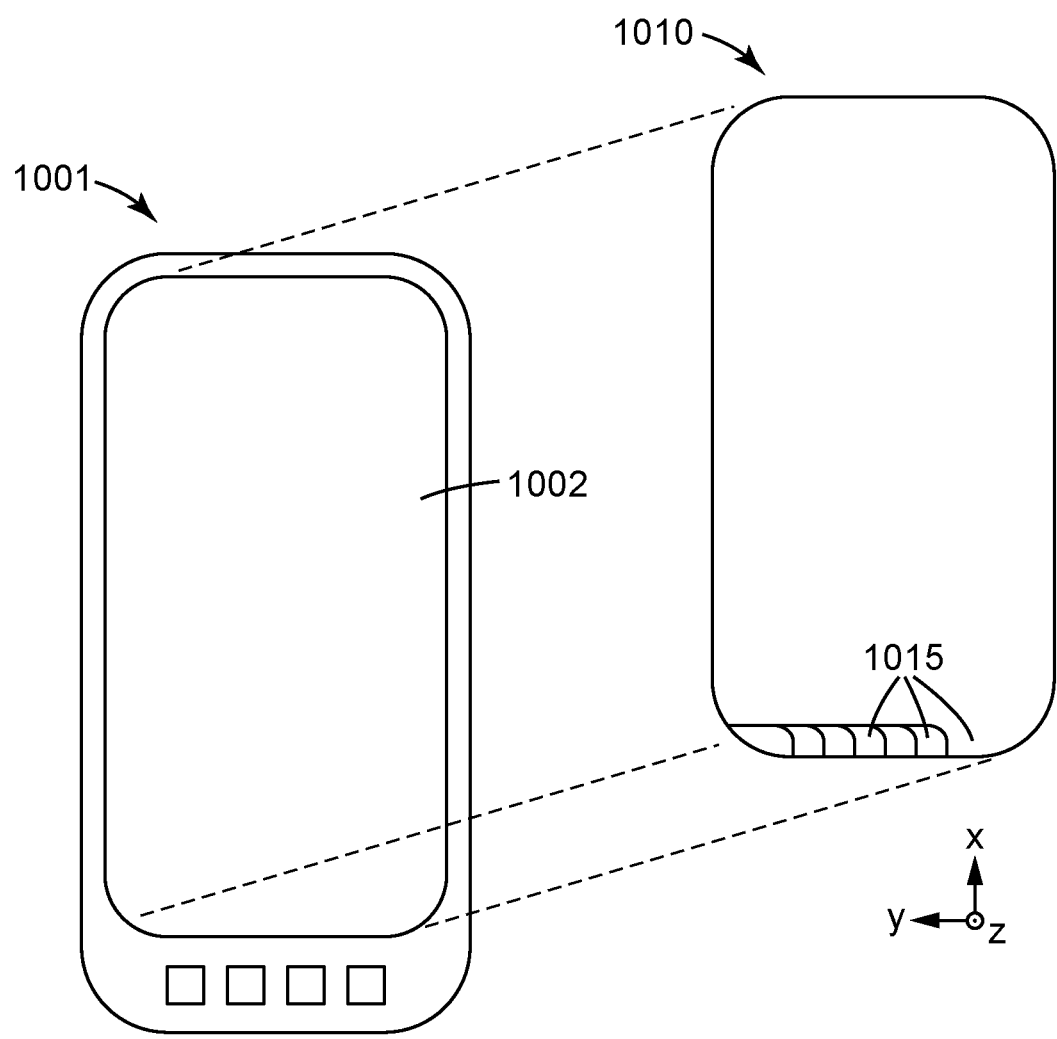
FIG. 10 is a schematic view of an electronic device in combination with a multilayered polymer film that can be applied to a display of the device as a workpiece.

Turning now to FIG. 10, we see there a schematic depiction of how any of the multilayered polymer films disclosed herein can be applied to a workpiece of interest. An electronic device 1001, e.g. a portable electronic device such as a mobile phone or smart phone, has a display 1002 which may also include a touch screen that covers the display and that is transparent so that the display can be viewed. The display 1002 may provide information in the form of icons, alphanumeric characters, or in any other known format. A user may interact with the device 1001 by single or multiple touches (e.g. touch-based gestures) on the touch screen, in response to which changing images or other changing information appears on the display 1002. Alternatively, the display 1002 may not include any touch screen, but may nevertheless be subject to contamination by frequent touching or other external influences. Repeated use of the device 1001 may lead to the buildup and growth of bacteria and/or other microorganisms on the exposed surface of the touch screen or display 1002. Furthermore, prolonged exposure of the device 1001, or the display 1002 thereof, to UV light may be a concern.

To protect the device 1001 from damage due to UV light exposure, and furthermore to improve hygiene and reduce the likelihood that the device 1001 will become a breeding ground for bacteria or other microorganisms, a successively peelable multilayered polymer film 1010, such as any of those light-transmissive embodiments described herein, may be adhered to the touch screen or display 1002. The film 1010 may be configured such that a front-most polymer layer in each layer packet includes a UV light stabilizer additive and an antimicrobial additive. The film 1010 may be die cut in a shape that matches the shape of the display 1002, as pictured in the figure. In this application, the film 1010 is preferably transparent and optically clear, with few or no significant optical defects that would interfere with observable details of the image provided by the display 1002. The film 1010 may also comprise an optically clear pressure sensitive adhesive layer (see e.g. layer 112 in FIGS. 1A through 1D) that functions to adhere the film 1010 to the touch screen or display 1002, preferably with few or no entrapped air bubbles. The film 1010 may also include access tabs 1015, which may be the same as or similar to access tabs 515 in FIGS. 5A-5B, to facilitate the irreversible delamination or peeling away of individual layer packets from the remainder of the film to expose a fresh or pristine polymer layer of the next layer packet. The user may instigate such delaminations if or when prolonged exposure to sunlight or the like produces UV-induced excessive haze or excessive color change in the film 1010. The film 1010 may also comprise any other structures or features described herein. Note that if access tabs are provided in the film, a minor portion of the front-most layer of each interior layer packet (such minor portion corresponding to the regions of the respective access tab) will be exposed to contact, and contamination, by users. However, the large majority of the surface of each such front-most interior layer, e.g., at least 90% or at least 95%, or at least 98% of the area of the major surface, is pristine and protected from contamination by virtue of being covered up by one or more of the other coextruded layer packets. If the tab-equipped-film is employed in an inverted orientation as discussed above in connection with FIG. 5B, such contamination may be limited somewhat, since the minor portion (e.g. 10% or less, or 5% or less, or 2% or less) of the area of the major surface which is subject to contamination is in an inverted orientation, and is thus shielded from finger touches or other direct contacts, while still being susceptible to airborne and/or waterborne contamination and the like.

EXAMPLES

The foregoing principles were used to fabricate and test several multilayered polymer films having the delamination and UV mitigation properties discussed herein.

Two non-peelable polymer films were also made or obtained and tested for comparison purposes. A first such film, referred to herein as "Comp 1", was a single layer of a low haze polyethylene terephthalate (PET). The single-layer Comp 1 film had a physical thickness of 3.8 mils (97 microns). The Comp 1 film did not contain any UV light stabilizer.

A second comparative film, referred to herein as "Comp 2", was also a single layer of PET, but the PET was UV stabilized, in particular, it contained 2.3 wt. % of a triazine UV absorber, specifically, product code Tinuvin™ 1577 available from BASF. The single-layer Comp 2 film had a physical thickness of 2 mils (50 microns).

A multilayered polymer film 1, referred to herein as "MPF 1", used a polymer layer stack having a repeating ABC layer arrangement similar to that shown in FIG. 6. For this MPF 1 film, the A, B, and C layers were composed of polymer compositions A, B, and C, respectively, as follows:
  polymer composition A: polyethylene terephthalate (PET), specifically, product code 1N404 from Nan Ya Plastics Corp. USA, Livingston, N.J.;
  polymer composition B: PETg copolyester, specifically, product code EASTAR GN071 from Eastman Chemical Co., Kingsport, Tenn.; and
  polymer composition C: a blend of 90 wt. % polypropylene (product code SR549M from LyondellBasell Company) and 10 wt. % of a styrene ethylene propylene styrene (SEBS) block copolymer resin (product code KRATON G1657 from Kraton Performance Polymers Inc., Houston, Tex.).
These materials are all coextrudable with each other and are all melt processable at a temperature of 204 degrees C. (400 degrees F.) or greater. These materials were heated and coextruded to form a 43-layer stack using a single feedblock that was fed by three extruders—one containing polymer composition A, one containing polymer composition B, and one containing polymer composition C. The 43-layer extrudate flowed into an 8 inch (approx. 203 mm) die, and was cast onto a chilled casting wheel with electrostatic pinning, which produced the MPF 1 film. The extruders, die, and feedblock were heated to temperatures of 500 to 530 degrees F. (260 to 277 C) during the extrusion of this film sample. After casting, the MPF 1 film was biaxially stretched and oriented 300%×300% at 105 degrees C. using a KARO™ batch-oven stretching machine, available from Bruckner Inc., Greenville, S.C.

Of the 43 total polymer layers in the MPF 1 film, 42 of these layers formed a polymer layer stack with the layers arranged in a repeating ABC pattern similar to that shown in FIG. 6, but with 14 layer packets. One A layer was at the top or front of each layer packet, one B layer was in the interior of each layer packet, and one C layer was at the bottom or back of each layer packet. The (oriented) physical thickness of each ABC layer packet was 0.3 mils (7.6 microns), wherein the physical thickness of each A layer was 0.12 mils (3 microns), the physical thickness of each B layer was 0.06 mils (1.5 microns), and the physical thickness of each C layer was 0.11 mils (2.8 microns). To this stack of 14 ABC layer packets was added, at the back-most or bottom-most C layer, one additional (coextruded) layer of polymer composition A, this additional A layer having a physical thickness of 0.3 mils (7.6 microns). The total caliper or physical thickness of the MPF 1 film was 4.5 mils (114 microns). The MPF 1 film, with its stack of 43 polymer layers, had a clear, light-transmissive appearance.

A multilayered polymer film 2, referred to herein as "MPF 2", was substantially the same, and made in the same way, as the MPF 1 film, except that all 15 of the A layers were composed of 98 wt. % PET and 2 wt. % of the triazine UV absorber (product code Tinuvin™ 1577 available from BASF) used in the Comp 2 film. Other than this, the MPF 2 film had the same configuration and construction as the MPF 1 film, i.e., the MPF 2 film had 14 ABC layer packets and one additional A layer, was biaxially oriented 300%×300% at 105 degrees C., had an overall physical thickness of 4.5 mils (114 microns), and had a clear, light-transmissive appearance.

A multilayered polymer film 3, referred to herein as "MPF 3", was substantially the same, and made in the same way, as the MPF 1 film, except that all 15 of the A layers were composed of 99 wt. % PET and 1 wt. % of a triazine UV absorber (product code Tinuvin™ 1600 available from BASF). Other than this, the MPF 3 film had the same configuration and construction as the MPF 1 and MPF 2 films, i.e., the MPF 3 film had 14 ABC layer packets and one additional A layer, was biaxially oriented 300%×300% at 105 degrees C., had a physical thickness of 4.5 mils (114 microns), and had a clear, light-transmissive appearance.

Each of the three multilayered polymer films MPF 1, MPF 2, and MPF3: was configured to promote delamination between layer packets rather than along interfaces within the layer packets (because the bond strength between adjacent A and C layers was weaker than the bond strength between A and B layers, and weaker than the bond strength between B and C layers); had a polymer layer stack whose polymer layers were made by a single coextrusion operation, as well as a stretching step, and whose polymer compositions were melt processable at melt temperatures of 204 degrees C. (400 degrees F.) or greater; contained no adhesive layers and no pressure sensitive adhesive layers; and had an average transmission over visible wavelengths of greater than 80%, and greater than 85%, and greater than 90%, and an optical haze that was less than 8%, and less than 5%, and less than 4%, and less than 3%. Furthermore, for the MPF 2 and MPF 3 films: each layer packet had one polymer layer that contained an effective amount of a UV light stabilizer, and two polymer layers that contained no, or substantially no, UV light stabilizer. For the MPF 1 film, all three polymer layers in each layer packet contained no, or substantially no, UV light stabilizer.

Samples of the two comparative films and samples of the three peelable multilayered polymer films were then exposed to intense UV light over an extended time period as part of accelerated weathering tests. For these tests, each film sample was attached to a thick glass plate using an optically clear transfer adhesive, and the UV light impinged on the film sample directly rather than through the glass plate. Optical characteristics of the tested films themselves (while still attached to the glass plate) were measured before, and at selected intervals of, the UV light exposure. The measured optical characteristics include optical haze, which was measured with a Haze-Gard Plus hazemeter (commercially available from BYK instruments), the b* color value, which was calculated based on measurements from a commercial spectrophotometer (product code Color-Eye 2180 from GretagMacbeth LLC), and spectral absorption (expressed in terms of optical density as a function of wavelength), which was calculated based on measurements from a commercial spectrophotometer (product code UV-255 from Shimadzu Corporation).

In a first accelerated weathering test, designated weathering test "A", each of the tested film samples was exposed in an accelerated artificial weathering test similar to ASTM G155 cycle 1 run without water spray and using a black panel temperature of 70 degrees C., and were then evaluated at intervals corresponding to UV dosage levels of 1170 kJ/m$^2$ at 340 nm. Table 1 lists the measured haze values before the UV exposure (0 hours) and at the 1170 kJ/m$^2$ increments, i.e., at total exposure dosages of 1170, 2340, and 3510 kJ/m$^2$ at 340 nm. With regard to the columns labeled "1170AD", "2340AD", and "3510AD", these refer to exposure dosages of 1170, 2340, and 3510 kJ/m$^2$, respectively, but after an outermost (front-most) layer packet of a peelable multilayered polymer film was delaminated. (These columns have no applicability to the comparative films Comp 1 and Comp 2 since they cannot be delaminated, hence the entries "(n/a)" appear in those places.) For each of the three delamination procedures that was performed on each multilayered polymer film, the delamination was carried out in such a way that (in each case) the two outermost (front-most) layer packets may in some instances have been delaminated together as a single unit or sheet, rather than only the one outermost (front-most) layer packet.

TABLE 1

Percent haze measurements - accelerated weathering test A

| Film | UV Exposure Dosage (kJ/m$^2$) | | | | | | |
|---|---|---|---|---|---|---|---|
| | 0 | 1170 | 1170AD | 2340 | 2340AD | 3510 | 3510AD |
| Comp 1 | 2.2 | 3.1 | (n/a) | 3.4 | (n/a) | 5.2 | (n/a) |
| Comp 2 | 2.5 | 2.4 | (n/a) | 4.3 | (n/a) | 6.1 | (n/a) |
| MPF 1 | 2.5 | 1.9 | 2.2 | 2.3 | 1.7 | 1.9 | 2.6 |
| MPF 2 | 2.1 | 1.4 | 1.6 | 3.2 | 1.7 | 2.1 | 1.6 |
| MPF 3 | 1.2 | 1.2 | 1.8 | 1.7 | 2.2 | 2.5 | 2 |

Thus, for example, the MPF 1 film had a measured optical haze of 2.5% at a 0 dosage of UV exposure, and 1.9% at 1170 kJ/m$^2$ of 340 nm UV exposure. After the 1.9% haze measurement, but still at the same exposure dosage, the outermost layer packet of the MPF 1 film was delaminated from the remainder of the film, which reduced the number of (ABC) layer packets in the MPF 1 film from 14 to 13 or fewer (depending on whether one or two layer packets were delaminated). With this reduced number of layer packets, the optical haze of the MPF 1 film was measured again, and found to be 2.2%. This MPF 1 film was then exposed to an additional 1170 kJ/m$^2$ dosage of UV light, for a total dosage of 2340 kJ/m$^2$ at 340 nm, at which time the film was measured to have a haze of 2.3%. After this 2.3% haze measurement, but still at the same exposure dosage, the outermost layer packet of the MPF 1 film was delaminated from the remainder of the film, which reduced the number of (ABC) layer packets in the MPF 1 film still further. With this reduced number of layer packets, the optical haze of the MPF 1 film was measured again, and found to be 1.7%. This MPF 1 film was then exposed to an additional 1170 kJ/m$^2$ dosage of UV light, for a total dosage of 3510 kJ/m$^2$ at 340 nm, at which time the film was measured to have a haze of 1.9%. After this 1.9% haze measurement, but still at the same exposure dosage, the outermost layer packet of the MPF 1 film was delaminated from the remainder of the film, which reduced the number of (ABC) layer packets in the MPF 1 film still further. With this reduced number of layer packets, the optical haze of the MPF 1 film was measured again, and found to be 2.6%.

In connection with the same accelerated weathering test A and with the same two comparative film samples and three multilayered polymer film samples, the b* color coordinate or color value of each film sample was measured. Color tests were measured using a D65 2 degree light source in transmissive mode for the CIE L*a*b* coordinates. The results are listed in Table 2 in a format that matches the format of Table 1.

TABLE 2 b* color coordinate measurements - accelerated weathering test A

| Film | UV Exposure Dosage ( kJ/m$^2$) | | | | | | |
|---|---|---|---|---|---|---|---|
| | 0 | 1170 | 1170AD | 2340 | 2340AD | 3510 | 3510AD |
| Comp 1 | −4.5 | −2.1 | (n/a) | 1 | (n/a) | 3.5 | (n/a) |
| Comp 2 | 0.2 | 0.3 | (n/a) | 1.3 | (n/a) | 1.3 | (n/a) |
| MPF 1 | −5.2 | −2.3 | −4.1 | −3.5 | −4.6 | −4.2 | −4.3 |
| MPF 2 | −0.8 | −0.8 | −1.7 | −1.1 | −2.4 | −1.9 | −3.8 |
| MPF 3 | −1.3 | −1.1 | −2.2 | −0.6 | −2 | −1.2 | −2.9 |

Thus, for example, the MPF 1 film had a measured b* color value of −5.2 at a 0 dosage of UV exposure, and −2.3 at 1170 kJ/m$^2$ of 340 nm UV exposure. After the −2.3 b* measurement, but still at the same exposure dosage, the outermost layer packet of the MPF 1 film was delaminated from the remainder of the film, which reduced the number of (ABC) layer packets in the MPF 1 film from 14 to 13 or fewer (depending on whether one or two layer packets were delaminated). With this reduced number of layer packets, the b* color value of the MPF 1 film was measured again, and found to be −4.1. This MPF 1 film was then exposed to an additional 1170 kJ/m$^2$ dosage of UV light, for a total dosage of 2340 kJ/m$^2$ at 340 nm, at which time the film was measured to have a b* color value of −3.5. After this −3.5 b* measurement, but still at the same exposure dosage, the outermost layer packet of the MPF 1 film was delaminated from the remainder of the film, which reduced the number of (ABC) layer packets in the MPF 1 film still further. With this reduced number of layer packets, the b* color value of the MPF 1 film was measured again, and found to be −4.6. This MPF 1 film was then exposed to an additional 1170 kJ/m$^2$ dosage of UV light, for a total dosage of 3510 kJ/m$^2$ at 340 nm, at which time the film was measured to have a b* color value of −4.2. After this −4.2 b* measurement, but still at the same exposure dosage, the outermost layer packet of the MPF 1 film was delaminated from the remainder of the film, which reduced the number of (ABC) layer packets in the MPF 1 film still further. With this reduced number of layer packets, the b* color value of the MPF 1 film was measured again, and found to be −4.3.

Tables 1 and 2, despite a small amount of variability in the data (which may be due e.g. to sample handling, water spots, etc.), reveal substantial performance differences between the films. Over the cumulative 3510 kJ/m² dosage of UV light (measured at 340 nm), the Comp 1 film undergoes substantial yellowing (an increase in b* of 8) and a substantial increase in haze (an increase in haze of 4%). Over the same exposure period, the UV-stabilized Comp 2 film experiences a smaller degree of yellowing (an increase in b* of 1.1), and a smaller increase in haze, but the increase in haze (3.6%) is still greater than 2%, and greater than 3%. In comparison to these films, the peelable multilayered films exhibit much smaller increases in haze over the same exposure period, i.e., less than 3%, and less than 2%, and less than 1%, as a result of the successive delamination of their outermost layer packets as described above. With regard to yellowing, only one of the three peelable multilayered films—the MPF 1 film—exhibited an increase in b* over the total UV exposure. The MPF 2 and MPF 3 films had b* coordinates that decreased over the total UV exposure, i.e., the transmissive colors of those films moved towards the blue rather than towards the yellow over the course of the test. Without wishing to be bound by theory, this may be a result of the delamination of the top-most layer packets (peeled at each 1170 kJ/m² exposure interval) from the original films. Those delaminated layer packets contained UV absorbers, and, to the extent the UV absorbers may have some residual absorption at visible blue wavelengths, the delamination of those layers would allow more visible blue light to be transmitted through the (reduced) multilayered films simply as a result of the reduced amount of UV absorber in the film.

Figure 11A:
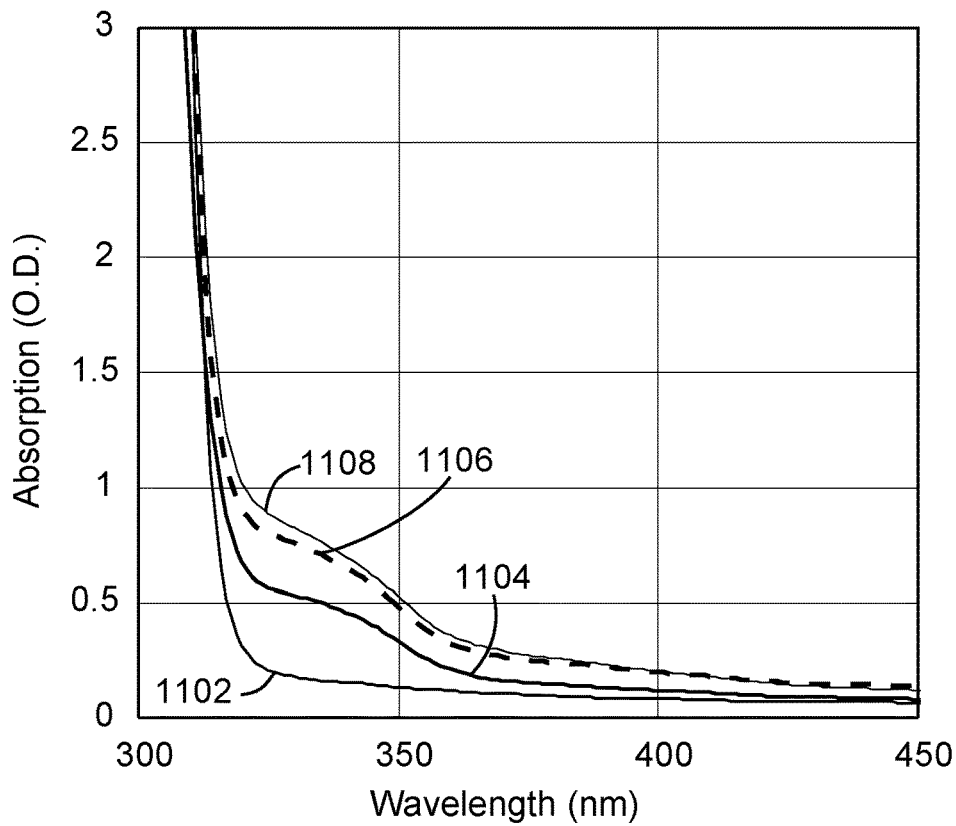
FIG. 11A is a graph of measured optical density versus wavelength for a single layer PET film, with different curves corresponding to different exposure times to UV light.
Figure 11B:
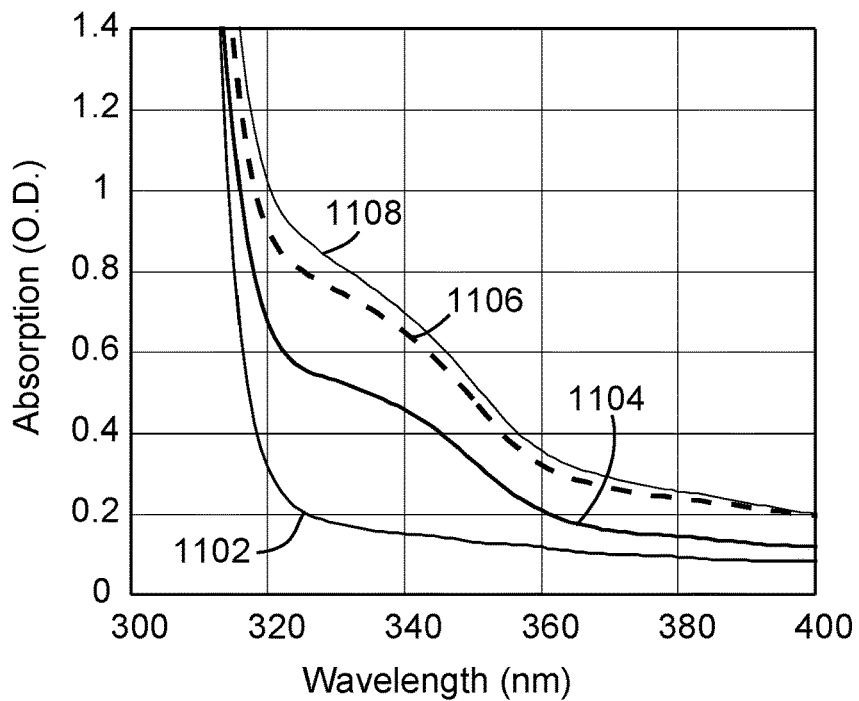
FIG. 11B is a magnified view of a portion of the graph of FIG. 11A.

In addition to the haze and b* measurements tabulated in Tables 1 and 2, some optical spectra were measured at the same 1170 kJ/m² dosage intervals (measured at 340 nm) for the accelerated weathering test A, and the absorption of the films were measured. The results for the Comp 1 film, where its absorption is given in terms of the optical density (O.D.), are shown in FIG. 11A. The optical density is a logarithmic parameter: an O.D. of 1 corresponds to a transmission of 10%, an O.D. of 2 corresponds to 1%, an O.D. of 3 corresponds to 0.1%, and so forth. FIG. 11B is simply an expanded view of a portion of the graph of FIG. 11A, where the same reference numerals are used to identify the same curves. In these figures, curve 1102 is the measured absorption of the Comp 1 film for a zero dosage of UV light, and curves 1104, 1106, and 1108 are for the same film at UV dosages (measured at 340 nm) of 1170, 2340, and 3510 kJ/m² (respectively).

Inspection and comparison of the curves 1102 through 1108 reveals an increase in optical density in the wavelength range from about 320-360 nm with increased UV exposure, which demonstrates chromophore development associated with photodegradation.

In a second accelerated weathering test, designated weathering test "B", different samples of the same tested films from weathering test A were exposed in an accelerated artificial weatherin test similar to SAE J2527 with daylight filters, and were then evaluated at intervals corresponding to UV dosage levels of 780 kJ/m² at 340 nm. Table 3 lists the measured haze values before the UV exposure (0 dosage) and at the 780 kJ/m² increments, i.e., at total exposure dosages of 780, 1560, and 2340 kJ/m² at 340 nm, and the table uses the same format as Table 1. Thus, Table 3 also has columns labeled "780AD", "1560AD", and "2340AD", and these again refer to exposure dosages of 780, 1560, and 2340 kJ/m² (at 340 nm), respectively, but after an outermost layer packet of a peelable multilayered polymer film was delaminated. (These columns have no applicability to the comparative films Comp 1 and Comp 2 since they cannot be delaminated, hence the entries "(n/a)" again appear in those places.) As before, for each of the three delamination procedures that was performed on each multilayered polymer film, the delamination was carried out in such a way that (in each case) the two outermost (front-most) layer packets may in some instances have been delaminated together as a single unit or sheet, rather than only the one outermost (front-most) layer packet.

TABLE 3

Percent haze measurements - accelerated weathering test B

| Film | UV Exposure Dosage (kJ/m²) | | | | | | |
|---|---|---|---|---|---|---|---|
| | 0 | 780 | 780AD | 1560 | 1560AD | 2340 | 2340AD |
| Comp 1 | 2.1 | 2.8 | (n/a) | 7.7 | (n/a) | 38.3 | (n/a) |
| Comp 2 | 2.4 | 2.5 | (n/a) | 5.8 | (n/a) | 7 | (n/a) |
| MPF 1 | 1.4 | 1.1 | 2.1 | 3 | 1.4 | 2.5 | 4.2 |
| MPF 2 | 1.7 | 1.8 | 2.1 | 2.5 | 2 | 3.3 | 2.4 |
| MPF 3 | 1.3 | 1.4 | 1.7 | 1.9 | 1.8 | 2.9 | 3.2 |

Thus, for example, the MPF 3 film had a measured optical haze of 1.3% at a 0 dosage of UV exposure, and 1.4% at 780 kJ/m² of UV exposure (measured at 340 nm). After the 1.4% haze measurement, but still at the same exposure dosage, the outermost layer packet of the MPF 3 film was delaminated from the remainder of the film, which reduced the number of (ABC) layer packets in the MPF 3 film from 14 to 13 or fewer (depending on whether one or two layer packets were delaminated). With this reduced number of layer packets, the optical haze of the MPF 3 film was measured again, and found to be 1.7%. This MPF 3 film was then exposed to an additional 780 kJ/m² dosage of UV light, for a total dosage of 1560 kJ/m² at 340 nm, at which time the film was measured to have a haze of 1.9%. After this 1.9% haze measurement, but still at the same exposure dosage, the outermost layer packet of the MPF 3 film was delaminated from the remainder of the film, which reduced the number of (ABC) layer packets in the MPF 3 film still further. With this reduced number of layer packets, the optical haze of the MPF 3 film was measured again, and found to be 1.8%. This MPF 3 film was then exposed to an additional 780 kJ/m² dosage of UV light, for a total dosage of 2340 kJ/m² at 340 nm, at which time the film was measured to have a haze of 2.9%. After this 2.9% haze measurement, but still at the same exposure dosage, the outermost layer packet of the MPF 3 film was delaminated from the remainder of the film, which reduced the number of (ABC) layer packets in the MPF 3 film still further. With this reduced number of layer packets, the optical haze of the MPF 3 film was measured again, and found to be 3.2%.

In connection with the same accelerated weathering test B and with the same two comparative film samples and three multilayered polymer film samples, the b* color coordinate or color value of each film sample was measured in the same was as for Table 2 above. The results are listed in Table 4 in a format that matches the format of Table 3.

TABLE 4 b* color coordinate measurements - accelerated weathering test B

| Film | UV Exposure Dosage (kJ/m²) | | | | | | |
|---|---|---|---|---|---|---|---|
| | 0 | 780 | 780AD | 1560 | 1560AD | 2340 | 2340AD |
| Comp 1 | −4.6 | −3.1 | (n/a) | −0.7 | (n/a) | 0.3 | (n/a) |
| Comp 2 | 0.1 | −0.1 | (n/a) | −0.7 | (n/a) | 0.6 | (n/a) |
| MPF 1 | −5.4 | −3.8 | −5 | −0.3 | −5.6 | −4.7 | −4.7 |

TABLE 4-continued b* color coordinate measurements - accelerated weathering test B

| Film | UV Exposure Dosage (kJ/m$^2$) | | | | | |
|---|---|---|---|---|---|---|
| | 0 | 780 | 780AD | 1560 | 1560AD | 2340 | 2340AD |
| MPF 2 | −0.7 | −0.8 | −1.7 | −0.3 | −1.5 | −1.2 | −2.1 |
| MPF 3 | −1.5 | −1.5 | −2.2 | −0.6 | −2.2 | −1.5 | −2.5 |

Thus, for example, the MPF 2 film had a measured b* color value of −0.7 at a 0 dosage of UV exposure, and −0.8 at 780 kJ/m$^2$ of UV exposure (measured at 340 nm). After the −0.8 b* measurement, but still at the same exposure dosage, the outermost layer packet of the MPF 2 film was delaminated from the remainder of the film, which reduced the number of (ABC) layer packets in the MPF 2 film from 14 to 13 or fewer (depending on whether one or two layer packets were delaminated). With this reduced number of layer packets, the b* color value of the MPF 2 film was measured again, and found to be −1.7. This MPF 2 film was then exposed to an additional 780 kJ/m$^2$ dosage of UV light, for a total dosage of 1560 kJ/m$^2$ at 340 nm, at which time the film was measured to have a b* color value of −0.3. After this −0.3 b* measurement, but still at the same exposure dosage, the outermost layer packet of the MPF 2 film was delaminated from the remainder of the film, which reduced the number of (ABC) layer packets in the MPF 2 film still further. With this reduced number of layer packets, the b* color value of the MPF 2 film was measured again, and found to be −1.5. This MPF 2 film was then exposed to an additional 780 kJ/m$^2$ dosage of UV light, for a total dosage of 2340 kJ/m$^2$ at 340 nm, at which time the film was measured to have a b* color value of −1.2. After this −1.2 b* measurement, but still at the same exposure dosage, the outermost layer packet of the MPF 2 film was delaminated from the remainder of the film, which reduced the number of (ABC) layer packets in the MPF 2 film still further. With this reduced number of layer packets, the b* color value of the MPF 2 film was measured again, and found to be −2.1.

Similar to Tables 1 and 2, Tables 3 and 4 also contain a small amount of variability in the data, but also reveal similar substantial performance differences between the films. In both types of UV exposure trials, the Comp 1 film exhibits a large increase in haze (up to 36%) and a large increase in b* (5 to 8 points of increase) after the three UV exposure dosage intervals. In a similar fashion, the Comp 2 film exhibits a substantial increase in haze (3.6 to 4.6%) and more modest gains in b* (0.5 to 1). Relative to these comparative films, the MPF1, MPF2, and MPF3 films show very limited changes in haze (0 to 3%) and similarly show little (<1) if any increase in b* for the same cumulative UV exposure. Without wishing to be bound by theory, decreases in b* for the MPF2 and MPF3 films may be a result of the delamination of the top-most layer packets peeled at each exposure interval) from the original films, as explained above.

Figure 12A:
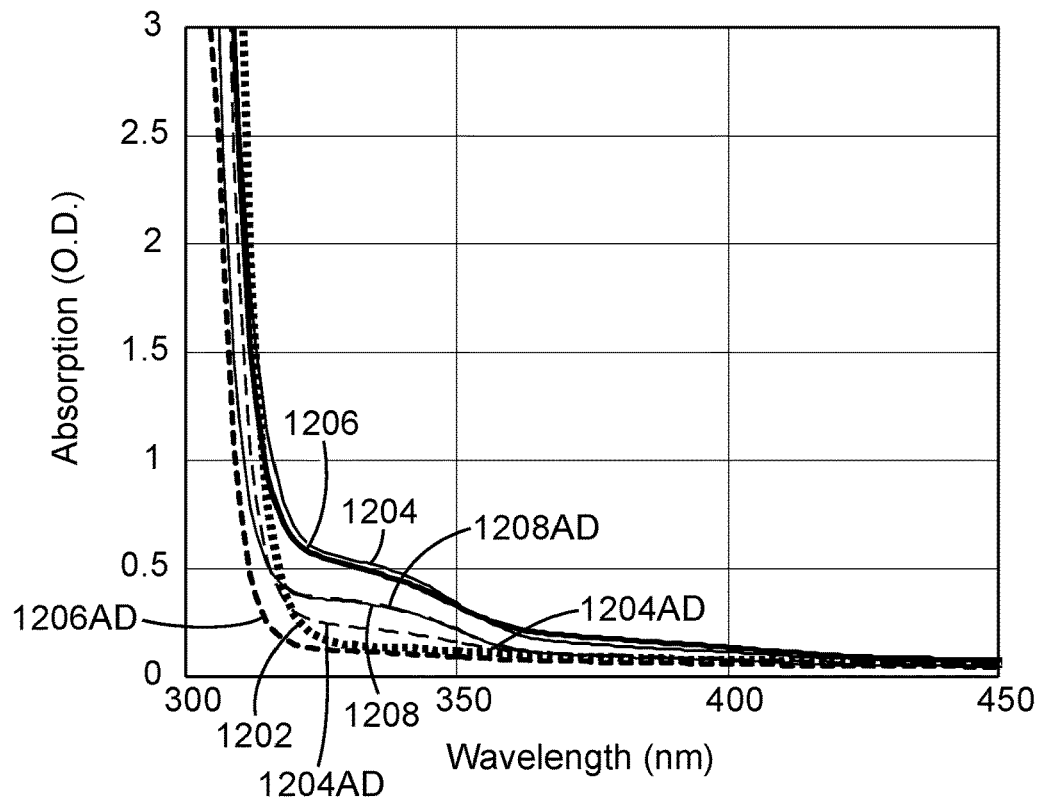
FIG. 12A is a graph of measured optical density versus wavelength for a multilayered polymer film configured for successive irreversible delamination, the film being composed of a stack of polymer layers that are organized into 3-layer (A-B-C) layer packets.
Figure 12B:
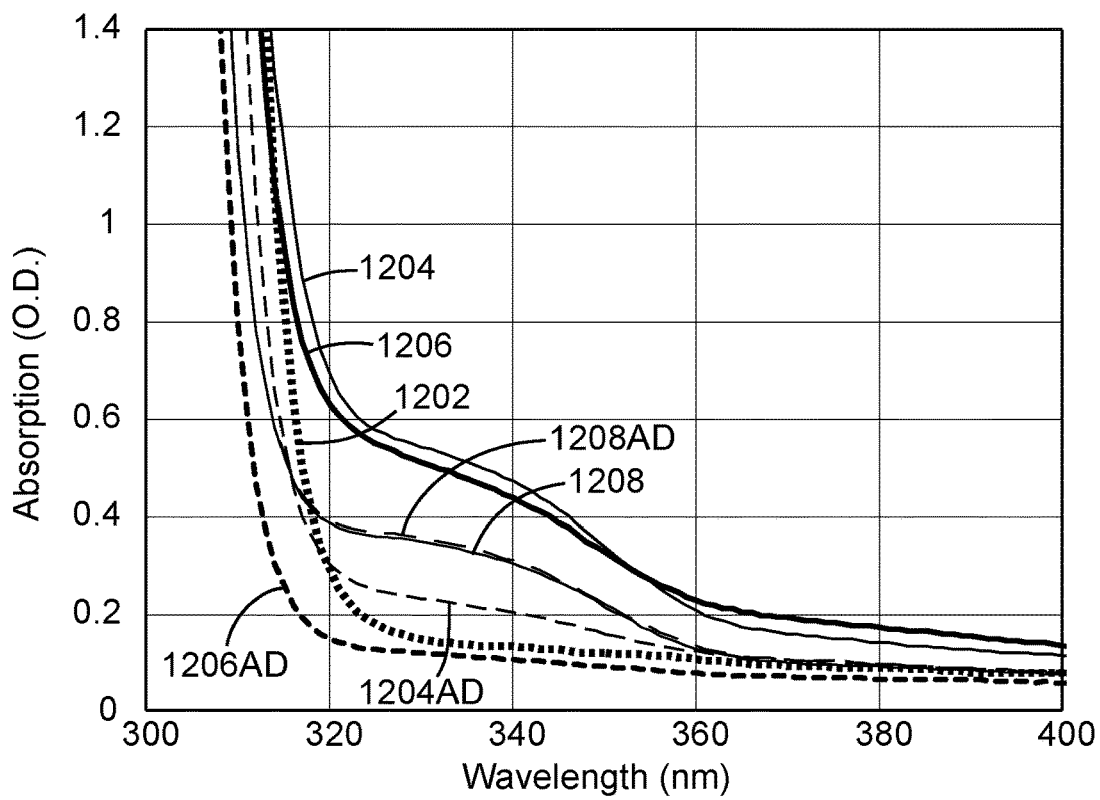
FIG. 12B is a magnified view of a portion of the graph of FIG. 12A.

In addition to the haze and b* measurements tabulated in Tables 3 and 4, some optical spectra were measured at the same UV exposure intervals for the accelerated weathering test B, and the absorption of the films was calculated. The results for the MPF 1 film, where its absorption is given in terms of the (logarithmic) optical density (O.D.), are shown in FIG. 12A. FIG. 12B is simply an expanded view of a portion of the graph of FIG. 12A, where the same reference numerals are used to identify the same curves. In these figures: curve 1202 is the measured absorption of the MPF 1 film for 0 UV light exposure; curve 1204 is the measured absorption of the MPF 1 film at 780 kJ/m$^2$ of UV exposure (measured at 340 nm); curve 1204AD is the measured absorption of the MPF 1 film at 780 kJ/m$^2$ of UV exposure, but after the outermost layer packet of the film was delaminated, such that the number of layer packets in the MPF 1 film was reduced from 14 to 13 or fewer (depending on whether one or two layer packets were delaminated); curve 1206 is the measured absorption of the MPF 1 film (with the reduced number of layer packets) at a UV exposure dosage of 1560 kJ/m$^2$; curve 1206AD is the measured absorption of the MPF 1 film at the 1560 kJ/m$^2$ UV exposure dosage, but after the outermost layer packet of the film was delaminated, such that the number of layer packets in the MPF 1 film was reduced from 13 (or fewer) to 12 (or fewer, depending on the number of layer packets that were delaminated); curve 1208 is the measured absorption of the MPF 1 film (with the further reduced number of layer packets) at a UV exposure dosage of 2340 kJ/m$^2$; and curve 1208AD is the measured absorption of the MPF 1 film at the 2340 kJ/m$^2$ UV exposure dosage, but after the outermost layer packet of the film was delaminated, such that the number of layer packets in the MPF 1 film was even further reduced.

Inspection of FIGS. 12A and 12B show that much of the photodegradation that occurs during the course of the prolonged UV light exposure can be removed by the repeated layer packet delaminations, and the film can be refreshed by this procedure.

The teachings herein can be combined with the teachings of one, some, or all of the following commonly assigned pending patent applications relating to peelable multiliayered polymer films: U.S. patent publication nos. 2014/0065397; 2016/0089858; and 2015/0183178. These patent publications are incorporated herein by reference. Thus, for example, the disclosed peelable multilayered polymer films that are used to mitigate UV-induced film degradation may also include one or more suitable antimicrobial agent as described in the '939 application, and/or may be post-formed or molded to provide a self-supporting contoured shape as described in the '097 application.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. The reader should assume that features of one disclosed embodiment can also be applied to all other disclosed embodiments unless otherwise indicated. All U.S. patents, patent application publications, and other patent and non-patent documents referred to herein are incorporated by reference, to the extent they do not contradict the foregoing disclosure.

This application discloses a variety of items relating to multilayered polymer films that can be used to mitigate optical degradation caused by excessive UV light exposure. These include, but are not limited to, the numbered items below.

Item 1 is a film comprising a stack of polymer layers, the polymer layers being organized into layer packets, each of the layer packets having at least two of the polymer layers;
wherein attachment between adjacent layer packets is weak enough to permit the layer packets to be separately irreversibly delaminated from a remainder of the stack, and the stack is configured to promote such irreversible delamination between such layer packets;
wherein all of the polymer layers in the stack of polymer layers have respective polymer compositions that are coextrudable with each other; and
wherein at least one of the polymer layers in a plurality of the layer packets comprises one or more ultraviolet (UV) light stabilizer.

Item 2 is the film of item 1, wherein at least one of the polymer layers in each of the layer packets comprises the one or more UV light stabilizer.

Item 3 is the film of item 2, wherein the one or more UV light stabilizer includes a first UV light stabilizer, and wherein the at least one polymer layer in each layer packet that comprises the one or more UV light stabilizer comprises the first UV light stabilizer.

Item 4 is the film of item 2, wherein for each layer packet in the stack, the at least one polymer layer comprising the one or more UV light stabilizer is disposed at a front of such layer packet.

Item 5 is the film of any of items 2 through 4, wherein each layer packet in the stack further includes at least one polymer layer that comprises substantially no UV light stabilizer.

Item 6 is the film of any of items 2 through 5, wherein each layer packet has only one polymer layer that comprises the one or more UV light stabilizer.

Item 7 is the film of any of previous item, wherein the one or more UV light stabilizer comprises a UV absorber.

Item 8 is the film of any previous item, wherein the one or more UV light stabilizer comprises an antioxidant.

Item 9 is the film of any previous item, wherein the one or more UV light stabilizer comprises a hindered amine light stabilizer (HALS).

Item 10 is the film of any previous item, wherein an attachment between any two adjacent layer packets is characterized by a peel force in a range from 2 to 100 grams per inch (0.8 to 38.6 N/m).

Item 11 is the film of any previous item, wherein the stack is configured with access tabs that provide access to interfaces between adjacent layer packets.

Item 12 is the film of any previous item, wherein the polymer layers are arranged in a repeating AB sequence.

Item 13 is the film of any of items 1 through 11, wherein the polymer layers are arranged in a repeating ABC sequence.

Item 14 is the film of any of items 1 through 11 or 13, wherein the stack is configured such that for every pair of adjacent layer packets in the stack, attachment between the layer packets is weaker than attachment between the polymer layers within the layer packets, such that irreversible delamination tends to occur between the layer packets rather than within the layer packets.

Item 15 is the film of item 14, wherein an attachment between adjacent layer packets is characterized by a first peel force, and wherein a weakest attachment of polymer layers within each layer packet is characterized by a second peel force, and wherein the second peel force is at least two times the first peel force.

Item 16 is the film of item 14, wherein the polymer layers are arranged in a repeating ABC sequence.

Item 17 is the film of item 16, wherein attachment between polymer layers A and C is weaker than attachment between polymer layers A and B, and is also weaker than attachment between polymer layers B and C.

Item 18 is the film of any previous item, wherein all of the polymer layers in the stack of polymer layers have respective polymer compositions that are melt processable at a melt temperature of 204 degrees C. (400 degrees F.) or greater.

Item 19 is the film of any previous item, wherein at least some of the polymer layers in the stack are oriented and have a birefringence of at least 0.05.

Item 20 is the film of any previous item, wherein none of the polymer layers that are disposed at interfaces of adjacent layer packets are tacky at room temperature.

Item 21 is the film of any previous item, wherein each of the layer packets in the stack has a thickness of no more than 2 mils (50 microns).

Item 22 is the film of any previous item, wherein the polymer layers are organized into at least N layer packets, where N is at least 5.

Item 23 is the film of item 22, wherein N is at least 10, and wherein the film has an overall thickness of no more than 15 mils (380 microns).

Item 24 is the film of any previous item, wherein the stack of polymer layers has an average transmission over visible wavelengths of at least 80% and an optical haze of less than 15%.

Item 25 is the film of item 24, wherein the stack of polymer layers has an optical haze of less than 8%, or less than 5%, or less than 4%, or less than 3%, or less than 2%.

Item 26 is a method, comprising:
providing a film comprising a stack of polymer layers, the polymer layers being organized into layer packets with each layer packet having at least two of the polymer layers, the stack being configured to promote irreversible delamination between such layer packets, all of the polymer layers in the stack having respective polymer compositions that are coextrudable with each other;
exposing the film to a sufficient amount of ultraviolet (UV) light such that the film exhibits optical degradation due to the UV light exposure, the optical degradation being primarily associated with a first one of the layer packets; and
delaminating the first layer packet from a remainder of the stack.

Item 27 is the method of item 26, wherein at least one of the polymer layers in a plurality of the layer packets comprises one or more UV light stabilizer.

Item 28 is the method of either of items 26 or 27, wherein the optical degradation comprises an increase in optical haze of 1% or more, or 2% or more, or 3% or more, or 5% or more, or 10% or more, and/or an increase in CIE b* color coordinate of 2 or more.

The invention claimed is:
1. A film comprising:
a co-extruded stack of polymer layers, the polymer layers being organized into layer packets, each layer packet comprising a first layer, a second layer, and a third layer, the second layer being disposed between the first layer and the third layer;

a packet interface between first and third layers of adjacent layer packets, the packet interface exhibiting a first peel force of 1 g/inch or greater; and layer interfaces between adjacent first and second layers and adjacent second and third layers, the layer interfaces exhibiting a second peel force that is greater than the first peel force, wherein the first layer has a first composition comprising a semi-crystalline polyester;

the second layer has a second composition different from the first composition and comprises a copolyester or styrenic block copolymer; and the third layer has a third composition different from the first and second compositions and comprises a blend of olefin and styrenic block copolymer, wherein at least one of the layers comprises one or more ultraviolet (UV) light stabilizers, and wherein the layer packets are separately irreversibly peelable from a remainder of the stack.

2. The film of claim 1, wherein the first layer comprises the one or more UV light stabilizers, and wherein the first layer is a front-most layer of the layer packet.

3. The film of claim 1, wherein the one or more UV light stabilizers comprise a UV absorber.

4. The film of claim 1, wherein the one or more UV light stabilizers comprise an antioxidant.

5. The film of claim 1, wherein the one or more UV light stabilizers comprise a hindered amine light stabilizer (HALS).

6. The film of claim 1, wherein the first layer comprises polyethylene terephthalate.

7. The film of claim 1, wherein the second layer comprises PETg copolyester.

8. The film of claim 1, wherein the third layer comprises styrene ethylene propylene styrene block copolymer.

9. The film of claim 1, wherein the film comprises one or more oriented layers having a birefringence of 0.05 or greater.

10. The film of claim 1, wherein one or more of the layers are uniaxially or biaxially stretched.

11. The film of claim 1, wherein the film comprises a plurality of kiss-cut tabs with differing depths.

12. The film of claim 1, wherein the film comprises markings that indicate how many peelable layer packets remain in the stack.

13. The film of claim 1, wherein the film has an average transmission over visible wavelengths of at least 80%.

14. The film of claim 1, wherein the film has an optical haze of less than 15%.

15. The film of claim 1, wherein the film is capable of absorbing UV light in a range of 300 nm to 400 nm.

16. The film of claim 1, wherein the film is constructed for covering at least a portion of a medical device.

17. The film of claim 1, wherein the film comprises a portion of a face shield.

18. The film of claim 1, wherein the film is constructed for covering a touch screen.

19. The film of claim 1, wherein the film comprises an anti-graffiti film.

20. The film of claim 1, wherein the film comprises an adhesive backing layer.

21. The film of claim 1, wherein the film comprises a release liner.

* * * * *